(12) United States Patent
Amano et al.

(10) Patent No.: US 8,527,576 B2
(45) Date of Patent: Sep. 3, 2013

(54) DATA ACCESS CONTROL SYSTEM AND METHOD ACCORDING TO POSITION INFORMATION OF MOBILE TERMINAL

(75) Inventors: Takashi Amano, Yokohama (JP); Shoji Kodama, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 873 days.

(21) Appl. No.: 12/068,201

(22) Filed: Feb. 4, 2008

(65) Prior Publication Data

US 2009/0112967 A1 Apr. 30, 2009

(30) Foreign Application Priority Data

Oct. 30, 2007 (JP) ................................ 2007-281101

(51) Int. Cl.
*G06F 15/16* (2006.01)

(52) U.S. Cl.
USPC ......................................................... 709/201

(58) Field of Classification Search
USPC ........................................ 713/201; 709/201
See application file for complete search history.

(56) References Cited

U.S. PATENT DOCUMENTS

| 7,360,248 B1 * | 4/2008 | Kanevsky et al. ............... 726/21 |
| 2003/0061166 A1 | 3/2003 | Saito et al. |
| 2003/0074580 A1 * | 4/2003 | Knouse et al. ................ 713/201 |

FOREIGN PATENT DOCUMENTS

JP 2003-99400 9/2001

* cited by examiner

*Primary Examiner* — Brian P Whipple
(74) *Attorney, Agent, or Firm* — Volpe and Koenig, P.C.

(57) ABSTRACT

To restrict data transmission to a mobile terminal according to a location of the mobile terminal when the mobile terminal requests data to a second computer, the mobile terminal does not log in the second computer. A communication method for a communication system having a first computer and the second computer, the first computer sends location information of the mobile terminal to the second computer, and the second computer controls data which is to be sent to the first computer according to an access right based on a predetermined location information by referring to received location information. Thereby, it can be controlled data sent to the mobile terminal.

14 Claims, 24 Drawing Sheets

LOCATION INFORMATION MANAGEMENT TABLE

| USER NAME | MOBILE TERMINAL LOCATION INFORMATION |
|---|---|
| A | UNITED STATES OF AMERICA |

URL LOCATION ACL

| URL | ACCESS-PERMITTED USER | ACCESS-PERMITTED LOCATION |
|---|---|---|
| http://www.aaa.bbb/c.html | A, B, C | JAPAN |
| http:// www.aaa.ccc/index.html | A, B | UNITED STATES OF AMERICA |
| http:// www.aaa.ddd/e.html | A, C | * |

LOCATION ACL SUPPORTING WEB SERVER MANAGEMENT TABLE

| LOCATION ACL SUPPORTING WEB SERVER |
|---|
| www.aaa.bbb |
| www.aaa.ccc |
| www.aaa.ddd |
| www.aaa.eee |

| FILE NAME 1091 | ACCESS-PERMITTED USER 1092 | ACCESS-PERMITTED LOCATION 1093 |
|---|---|---|
| ¥a¥b¥xxxx.aaa | A, B, C | JAPAN |
| ¥a¥c¥yyyy.aaa | A, B | UNITED STATES OF AMERICA |
| ¥a¥d¥zzzz.aaa | A, C | * |

FILE LOCATION ACL

FIG. 8

| FILE NAME | ACCESS-PERMITTED LOCATION |
|---|---|
| ¥a¥b¥xxxx.aaa | JAPAN |
| ¥a¥c¥yyyy.aaa | UNITED STATES OF AMERICA |
| ¥a¥d¥zzzz.aaa | * |
| ⋮ | ⋮ |

FILE LOCATION ACL

FIG. 20

| MOBILE TERMINAL LOCATION | FIXED-COMPUTER IP ADDRESS |
|---|---|
| JAPAN | 192.168.0.10 |
| UNITED STATES OF AMERICA | 192.168.5.200 |
| INSIDE COMPANY | 192.168.10.50 |
| ⋮ | ⋮ |

LOCATION MANAGEMENT TABLE

FIG. 24

| LIMITING KEYWORD | ACCESS-PERMITTED LOCATION |
|---|---|
| KEYWORD1 | UNITED STATES OF AMERICA |
| KEYWORD2 | INSIDE COMPANY A |
| KEYWORD3 | CALIFORNIA |
| ⋮ | ⋮ |

KEYWORD-BASED LOCATION ACL

FIG. 25

| FILE NAME | KEYWORD LIST |
|---|---|
| ¥a¥b¥xxxx.aaa | KEYWORD1, KEYWORD5, KEYWORD11, ···, KEYWORD100 |
| ¥a¥c¥yyyy.aaa | KEYWORD1, KEYWORD5, KEYWORD11, KEYWORD13 |
| ¥a¥d¥zzzz.aaa | KEYWORD20, KEYWORD26, KEYWORD36, ···, KEYWORD254 |
| ⋮ | ⋮ |

INDEX TABLE

FIG. 26

DATA ACCESS CONTROL SYSTEM AND METHOD ACCORDING TO POSITION INFORMATION OF MOBILE TERMINAL

CLAIM OF PRIORITY

The present application claims priority from Japanese patent application JP 2007-281101 filed on Oct. 30, 2007, the content of which is hereby incorporated by reference into this application.

BACKGROUND

This invention relates to a technology of controlling access to a fixed computer from a mobile terminal.

JP 2003-099400 A discloses a technology of controlling access to files, folders, and the like stored in a predetermined device, according to the current location of a mobile personal computer.

In JP 2003-099400 A, in order to perform security management of a mobile terminal or the like, security levels of the mobile terminal are stored in advance in a predetermined table in association with the locations of the mobile terminal. The current location of the mobile terminal is detected by a GPS or the like, and the security level corresponding to the detected current location is obtained from the predetermined table, such that activation of programs and/or access control to files and folders are performed based on the obtained security level.

SUMMARY

However, in the above-mentioned conventional technology, access to information stored in file servers, search engine servers, web servers, and the like made by the mobile terminal through a fixed computer cannot be controlled according to the location of the mobile terminal. This is because those information providing servers provide information to the fixed computer but cannot detect that the information provided to the fixed computer is further provided, through a remote operation, to the mobile terminal located at a location different from the fixed computer.

It is an object of this invention to allow access control based on location information of a mobile terminal in a case where a user accesses a fixed computer from the mobile terminal by using a remote operation function and further accesses information held by a server or the like coupled to the fixed computer through a network.

The location information of the mobile terminal is sent from the fixed computer remotely operated by the mobile terminal to a computer which is different from the fixed computer and from which data is obtained. According to the location information, the computer refers to data access control information based on location information specified in advance, and restricts data to be provided to the fixed computer.

According to this invention, it is possible to control access from the mobile terminal to data that the fixed computer remotely operated by the mobile terminal obtains from another computer.

BRIEF DESCRIPTION OF THE DRAWINGS

The present invention can be appreciated by the description which follows in conjunction with the following figures, wherein:

FIG. 4 is an explanatory diagram showing an example of a location information management table in accordance with the first embodiment of this invention;

FIG. 5 is an explanatory diagram showing an example of a URL location ACL in accordance with the first embodiment of this invention;

FIG. 6 is an explanatory diagram showing an example of a location ACL supporting web server management table in accordance with the first embodiment of this invention;

FIG. 8 is an explanatory diagram showing a file location ACL in accordance with the first embodiment of this invention;

FIG. 20 is an explanatory diagram showing a file location ACL in accordance with the second embodiment of this invention;

FIG. 24 is an explanatory diagram showing a configuration example of a location management table in accordance with the third embodiment of this invention;

FIG. 25 is an explanatory diagram showing a configuration example of a keyword-based location ACL in accordance with the third embodiment of this invention;

FIG. 26 is an explanatory diagram showing a configuration example of a index table in accordance with the third embodiment of this invention.

DETAILED DESCRIPTION OF THE PREFERRED EMBODIMENTS

First Embodiment

In a first embodiment, location information is stored in a webpage data display request and sent to a web server 900 and file access control is performed in a file server 108 by using a file location access control list (ACL) 109.

Hereinafter, the first embodiment of this invention will be described. It should be noted that this invention is not limited to the embodiments to be described below.

Figure 1:
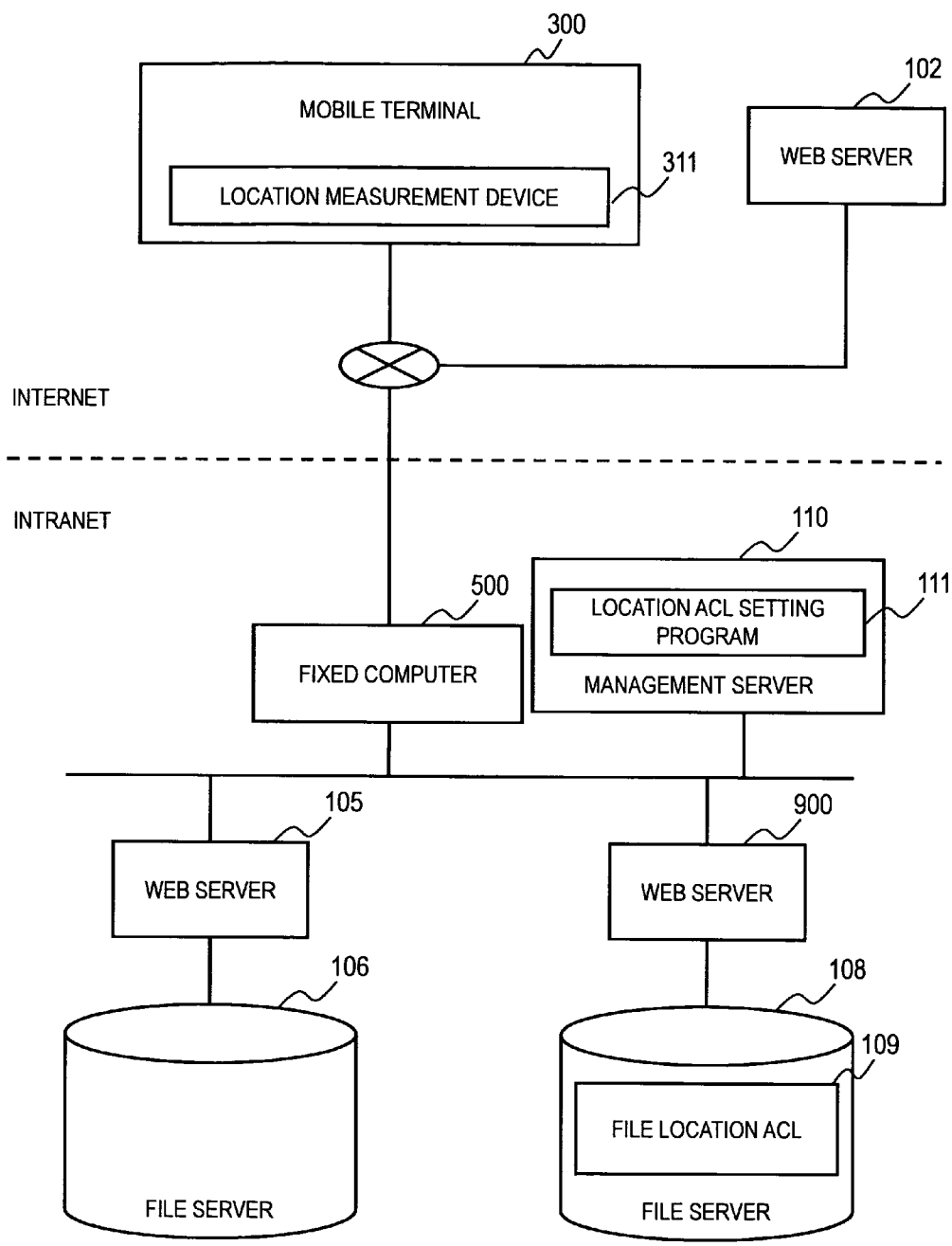
FIG. 1 is a block diagram showing a configuration example of a computer system in accordance with a first embodiment of this invention.

FIG. 1 shows a configuration example of a computer system according to the first embodiment of this invention.

A mobile terminal 300 is a portable information terminal such as a notebook computer. A location measurement device 311 is capable of specifying a location such as a country and an area, where the location measurement device 311 is located, and has a global positioning system (GPS), for example. The mobile terminal 300 includes the location measurement device 311.

The mobile terminal 300 receives, as screen information, a screen which is generated in a fixed computer 500 when the fixed computer 500 executes a processing program, from the fixed computer 500, and displays the screen information on the screen. The mobile terminal 300 does not generate a screen to be displayed by using data received from the fixed computer 500. Operation information inputted through the mobile terminal 300 is just transferred to the fixed computer 500. Upon reception of the inputted operation information, the fixed computer 500 executes the processing program in response to the input. The mobile terminal 300 does not process the inputted operation information.

Web servers 102, 105, and 900 generate and provide webpages which can be browsed with web browsers.

The fixed computer 500 has an access right to the web servers 102, 105, and 900. Further, the fixed computer 500 has a web browser, and therefore, can browse webpages generated by the web servers 102, 105, and 900. Because the mobile terminal 300 does not have a file access program, the mobile terminal 300 transfers an inputted operation to the fixed computer 500 and requests the processing program of the fixed computer 500 to recognize the inputted operation and to access the corresponding web server. The fixed computer 500 serves as an access request source of a webpage to issue a new access request to browse the webpage.

The fixed computer 500 provides a remote connection service. The mobile terminal 300 has a client function of the remote connection service, and can be remotely coupled to the fixed computer 500. When the mobile terminal 300 logs in the fixed computer 500, operates the fixed computer 500, and specifies a URL (the address to specify a webpage, in other words, the identifier (ID) for identifying data composing the webpage) in the web browser of the fixed computer 500, the mobile terminal 300 can browse the webpage provided by the web server 102, 105, or 900. The fixed computer 500 obtains information (file data) from the web server, generates screen display data, and sends the generated screen display data to the mobile terminal 300. Thus, the mobile terminal 300 can browse the same screen as that on the fixed computer 500. In this configuration, the fixed computer 500 and the web server are in a "client-server relationship". The web server provides the webpage to the fixed computer 500 but not to the mobile terminal 300, which remotely logs in the fixed computer 500. To the mobile terminal 300, the webpage data is then sent from the fixed computer 500. In other words, the web server cannot recognize the mobile terminal 300. Hereinafter, a description will be given on the assumption that the fixed computer 500, the web servers 105 and 900, a file server 106, and the file server 108 exist in an intranet, and the mobile terminal 300 and the web server 102 exist on the Internet.

The file server 106 stores files necessary for the web server 105 to generate webpages. The file server 108 stores files necessary for the web server 900 to generate webpages.

The file location ACL 109 is information indicating, for each file, whether access to the file is permitted, depending on the location of a request source accessing the file, and includes geographic location information, the file name (ID for identifying the file), and information indicating whether to permit access to the file from the location. When a file request which contains location information is issued, the access to the corresponding file from the specified location is controlled by referring to the file location ACL 109.

FIG. 1 shows an example in which the web server 900 serves as a location ACL supporting web server for performing access control based on the location information of the mobile terminal 300, and the file server 108 includes the file location ACL 109 and files. Upon reception of a new webpage request issued by the fixed computer 500, the web server 900 obtains the file location ACL from the file server that has the file composing the requested webpage. The web server 900 uses the location information contained in the webpage request and the location ACL to determine whether the file composing the webpage can be sent to the webpage request source. When it is determined that the file can be sent, the file server sends the file composing the webpage to the web server 900. When the data of the file is received from the file server, the web server 900 generates the webpage and provides the generated webpage to the fixed computer 500. When the data of the file is not provided, the web server 900 notifies that the webpage lacks data, to the fixed computer 500. It should be noted that a place where the location ACL is stored and a place where access control is performed by using the location ACL can be variously selected, which will be described in detail later.

A management server 110 includes a location ACL setting program 111 used to set the file location ACL 109. To set the file location ACL 109, the location ACL setting program 111 first reads the current setting of the file location ACL 109, from the file server 108. Next, an administrator performs required setting. After the setting of the administrator is finished, the location ACL setting program 111 sends information of the set file location ACL 109 to the file server 108 to finish the setting of the file location ACL 109.

Through the above-described access control performed according to the location of an access request source, when the location of an access request source is managed at a country level, it is possible to prevent information from being taken out to a country to which information transfer is restricted by law. Further, when the location of an access request source is managed at the level of whether the access request source is located in a company or not, secret data, confidential data, and the like can be easily managed.

Figure 2:
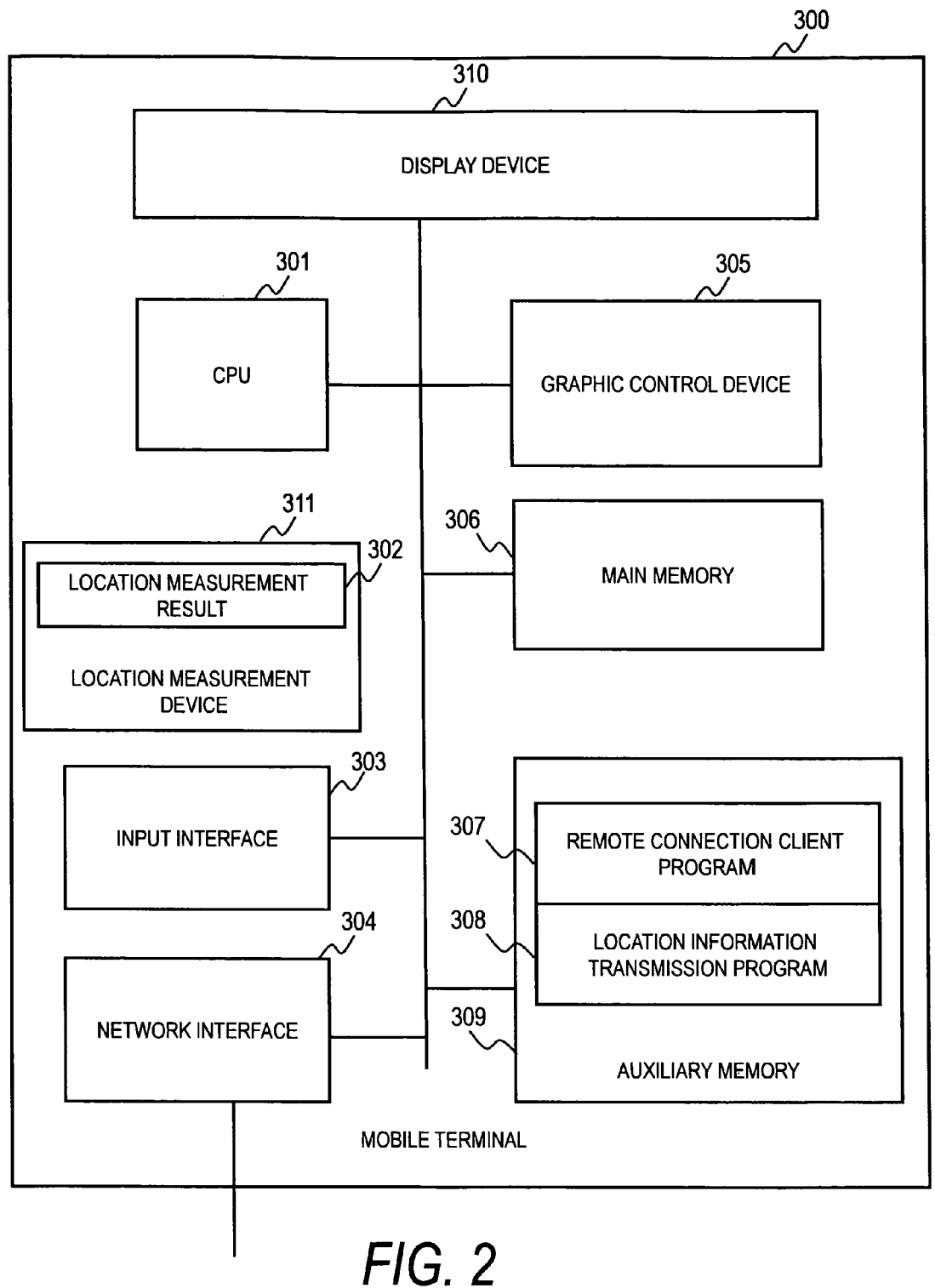
FIG. 2 is a block diagram showing a configuration example of a mobile terminal in accordance with the first embodiment of this invention.

FIG. 2 shows a configuration example of the mobile terminal 300.

A display device 310 displays data outputted by a graphic control device 305. A CPU 301 is a device for executing a remote connection client program 307 and a location information transmission program 308. A location measurement result 302 is data outputted after the location measurement device 311 measures the location information of the mobile terminal 300, or is information of a country or an area corresponding to the data. An input interface 303 is used to input characters and to move the cursor, and includes a keyboard and a mouse, for example. A network interface 304 is a communication device for sending and receiving messages through a network.

The graphic control device 305 processes screen display data received by the remote connection client program 307 from the fixed computer 500 and outputs the processed screen display data to the display device 310. A main memory 306 can be directly accessed by the CPU 301, and is used to store the remote connection client program 307 and the location information transmission program 308 when the programs are read from an auxiliary memory 309 and executed. The remote connection client program 307 is used to log in the fixed computer 500, which executes a remote connection service program 505.

The location information transmission program 308 is used to provide, when a request for the location information of the mobile terminal 300 is received from the fixed computer 500, location measurement data obtained after the location measurement device 311 measures the location of the mobile terminal 300, or information of a country or an area corresponding to the location measurement data, to the request source. The auxiliary memory 309 stores the remote connection client program 307 and the location information transmission program 308. Those programs are read from the auxiliary memory 309 to the main memory 306 when they are executed.

Figure 3:
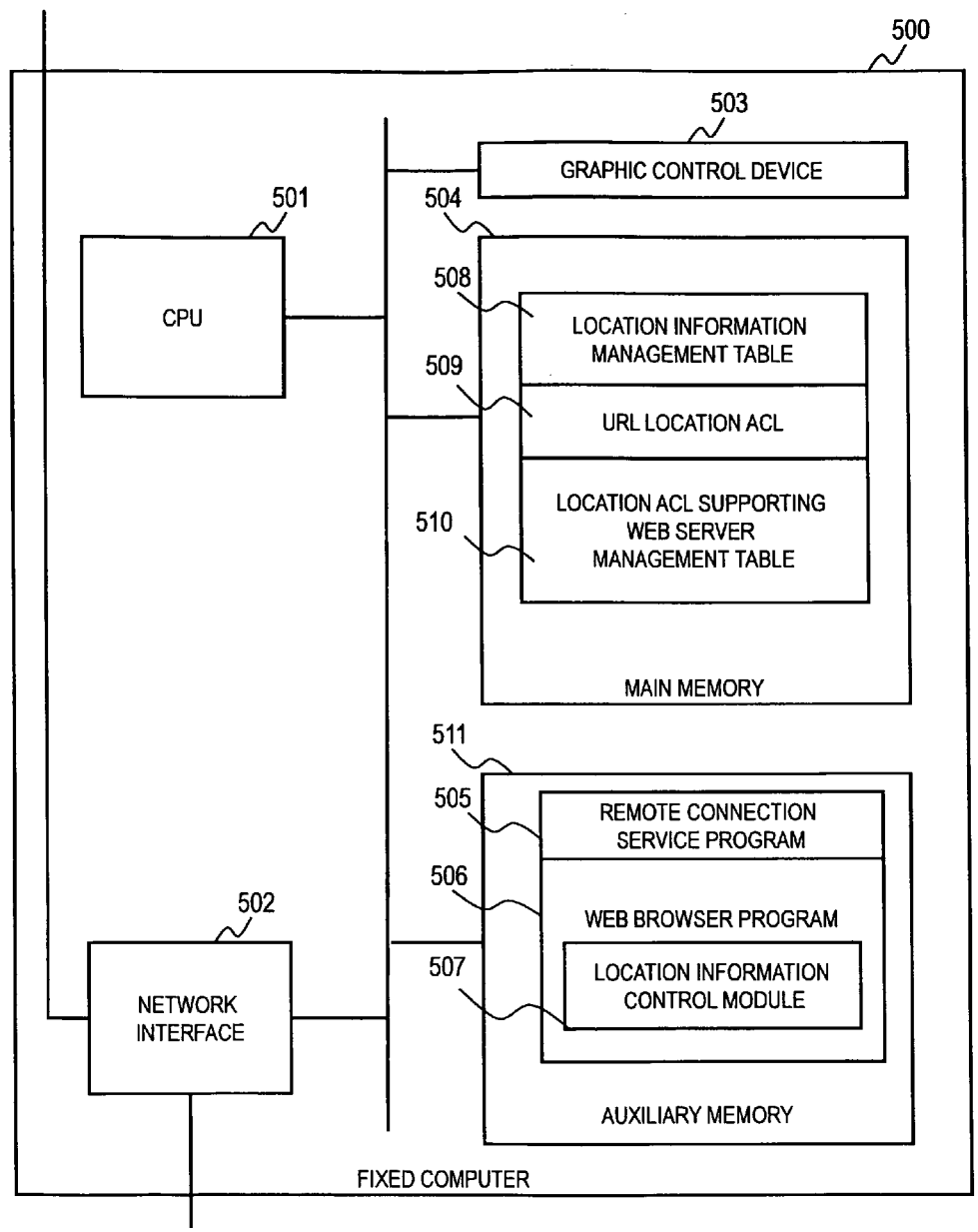
FIG. 3 is a block diagram showing a configuration example of a fixed computer in accordance with the first embodiment of this invention.

FIG. 3 shows a configuration example of the fixed computer 500.

A CPU 501 is a device for executing the remote connection service program 505 and a web browser program 506. A network interface 502 is a communication device for sending and receiving messages through a network. A graphic control device 503 is a device for processing screen display data that is received by the remote connection service program 505 which provides a remote connection service to the mobile terminal 300, and the web browser program 506 from a web server, and outputs the processed screen display data to the display device 310.

A main memory 504 can be directly accessed by the CPU 501, and is used to store the remote connection service program 505 and the web browser program 506 when the programs are read from an auxiliary memory 511 and executed.

The remote connection service program 505 is used for the mobile terminal 300 which executes the remote connection client program 307, to log in the fixed computer 500. The web browser program 506 is used to browse webpages provided by the web servers. The web browser program 506 has a control function (a location information control module 507) of requesting the location information transmission program 308 of the mobile terminal 300 to send the location information of the mobile terminal 300 and storing the location information received from the mobile terminal 300 in a location information management table 508 together with the name of the user who has logged in the fixed computer 500, when the web browser program 506 is executed by the CPU 501. The location information control module 507 sends a URL which the mobile terminal 300 requests the fixed computer 500 to display, a user name 5081, and mobile terminal location information 5082 to the web server 900, which supports the location ACL.

In the location information management table 508 included in the main memory 504, the user name 5081 and the mobile terminal location information 5082 are stored as shown in FIG. 4. If the location information management table 508 does not exist when the location information control module 507 stores the user name 5081 and the mobile terminal location information 5082, the location information control module 507 generates the location information management table 508 to store the user name 5081 and the mobile terminal location information 5082.

In a URL location ACL 509, a URL 5091, an access-permitted user (a user who is permitted to access) 5092, and an access-permitted location (a location where access is permitted) 5093 are stored as shown in FIG. 5. In a location ACL supporting web server management table 510, the names of location ACL supporting web servers are stored as shown in FIG. 6. The URL location ACL 509 and the location ACL supporting web server management table 510 are set by the management server 110 capable of communicating with the fixed computer 500. The administrator uses the location ACL setting program 111 of the management server 110 to generate and store the URL location ACL 509 and the location ACL supporting web server management table 510. The auxiliary memory 511 stores the remote connection service program 505 and the web browser program 506. Those programs are read from the auxiliary memory 511 to the main memory 504 when the programs are executed.

FIG. 4 shows an example of the location information management table 508 according to the first embodiment of this invention.

The user name 5081 indicates the name of a user who has currently logged in the fixed computer 500. The mobile terminal location information 5082 indicates location information that is measured with the location measurement device 311 in the mobile terminal 300 and is sent to the fixed computer 500 by the location information transmission program 308. It should be noted that, in this embodiment, the name of a country corresponding to the location information measured in the mobile terminal 300 is shown in the mobile terminal location information 5082, but measurement data measured with the location measurement device 311 or information of an area (such as the name of a state, a city, or a particular building) corresponding to the measurement data may also be used. When the area is narrowed down, more precise access control can be performed.

FIG. 5 shows an example of the URL location ACL 509 according to the first embodiment of this invention.

The URL 5091 registered in the URL location ACL 509 indicates a URL for which access control is performed to the user who uses the mobile terminal 300 at a certain location. For example, it is indicated that "http://www.aaa.bbb/c.html" shown in the URL 5091 is permitted to be accessed by users A, B, and C from Japan only.

The access-permitted user and the access-permitted location can be separately used as access control information for the URL. When URLs and information of access-permitted locations are used in a list, the list can be used to perform access control for the corresponding URL based on the location of an access request source, irrespective of the corresponding user. When URLs and information of access-permitted users are used in a list, the list can be used to prohibit access to the corresponding URL based on the user's identification (identification information for identifying the user), irrespective of the location of the user who has issued the access request.

FIG. 6 shows an example of the location ACL supporting web server management table 510 according to the first embodiment of this invention.

The location ACL supporting web server management table 510 indicates the name of a location ACL supporting web server that can perform access control for (can determine whether to permit access to) data according to the location information of a request source for the data. Each of web servers listed in the location ACL supporting web server management table 510 can control access to requested data or a requested URL according to the location information of the request source, by using the location ACL held by the web server or a location ACL located outside the web server. To issue a request for a webpage by using a URL, the fixed computer 500 refers to the location ACL supporting web server management table 510. When the request is issued to the location ACL supporting web server, the fixed computer 500 can rely on the web server to perform access control based on the location. However, when the request is issued to other web servers, the fixed computer 500 performs access control based on the location, when needed. This operation will be described later.

Figure 7:
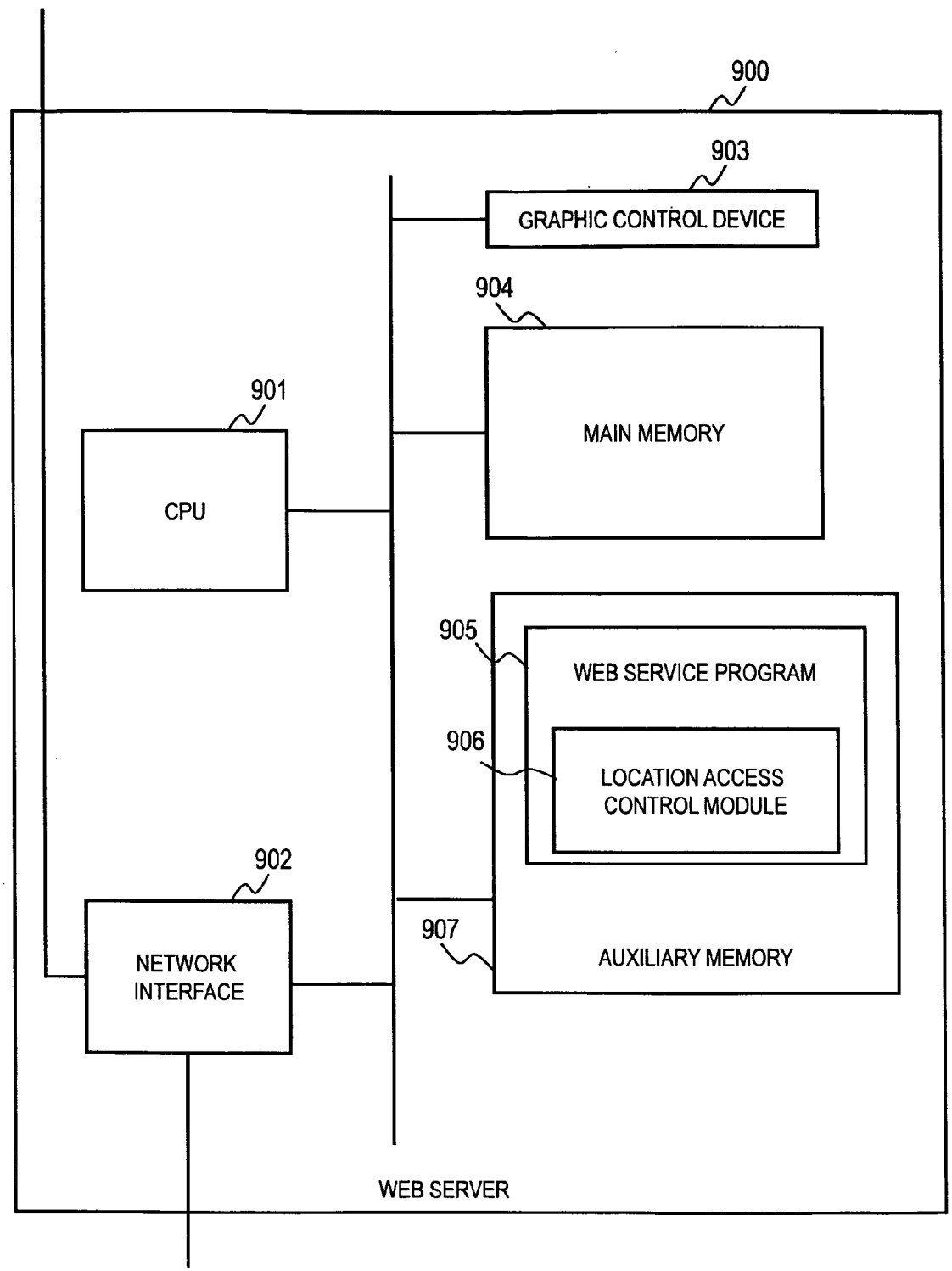
FIG. 7 is a block diagram showing a configuration example of a web server in accordance with the first embodiment of this invention.

FIG. 7 shows a configuration example of the web server 900 according to the first embodiment. The web server 900 includes a CPU 901, a network interface 902, a graphic control device 903, a main memory 904, an auxiliary memory 907, and a communication line which couples those devices.

The CPU 901 is a device for executing, in the main memory 904, a web service program 905 stored in the auxiliary memory 907. The network interface 902 is a communication device for sending and receiving messages to and from the fixed computer 500, the file server 109, and the management server 110 through the network coupling them. The graphic control device 903 processes screen display data received by the web service program 905 and outputs the processed screen display data to the display device 310. The main memory 904 can be directly accessed by the CPU 901, and is used to store the web service program 905 when the web service program 905 is read from the auxiliary memory 907 and executed.

The web service program 905 is used to generate the webpage corresponding to a URL requested from the web browser program 506 and provide the generated webpage to the web browser program 506. A location access control module 906 is a function realized when the web service program 905 is executed. The location access control module 906 requests the file server 108 to send the file location ACL 109, refers to the file location ACL 109 received from the file server 108 and the location information management table 508 obtained from the web browser program 506, and determines whether a corresponding file can be provided to the web browser program 506.

The auxiliary memory 907 stores the web service program 905. The web service program 905 is read from the auxiliary memory 907 to the main memory 904 when the web service program 905 is executed.

FIG. 8 shows the file location ACL 109 according to the first embodiment of this invention.

A file name 1091 indicates the name of a file required to generate a webpage. An access-permitted user 1092 indicates a user who is permitted to access a corresponding file. An access-permitted location 1093 indicates a country or an area from which access to a corresponding file is permitted. An asterisk (*) indicates that access is permitted from all countries or areas. It should be noted that, in this embodiment, a country name is shown in the access-permitted location 1093 for a file, but measurement data measured with the location measurement device 311 or information of an area corresponding to the measurement data may also be used. In this case, more precise location-based access control can be performed compared with the case of using the country name. It is also possible to perform the control at the level of continents such as Europe, North America, and Africa. The file location ACL 109 is generated by the administrator with the use of the location ACL setting program 111 of the management server 110. It should be noted that the access-permitted user and the access-permitted location can be separately used as access control information for the URL.

The difference in access control performed using the location ACL shown in FIG. 5 and the location ACL shown in FIG. 8 is as follows. With the location ACL of FIG. 5, the location-based access control is performed for each URL. While, with the location ACL of FIG. 8, the location-based access control is performed for each file composing the webpage specified by a URL. Therefore, with the use of the location ACL of FIG. 8, more precise access control can be performed.

Hereinafter, a further description will be given with reference to flowcharts.

Figure 9:
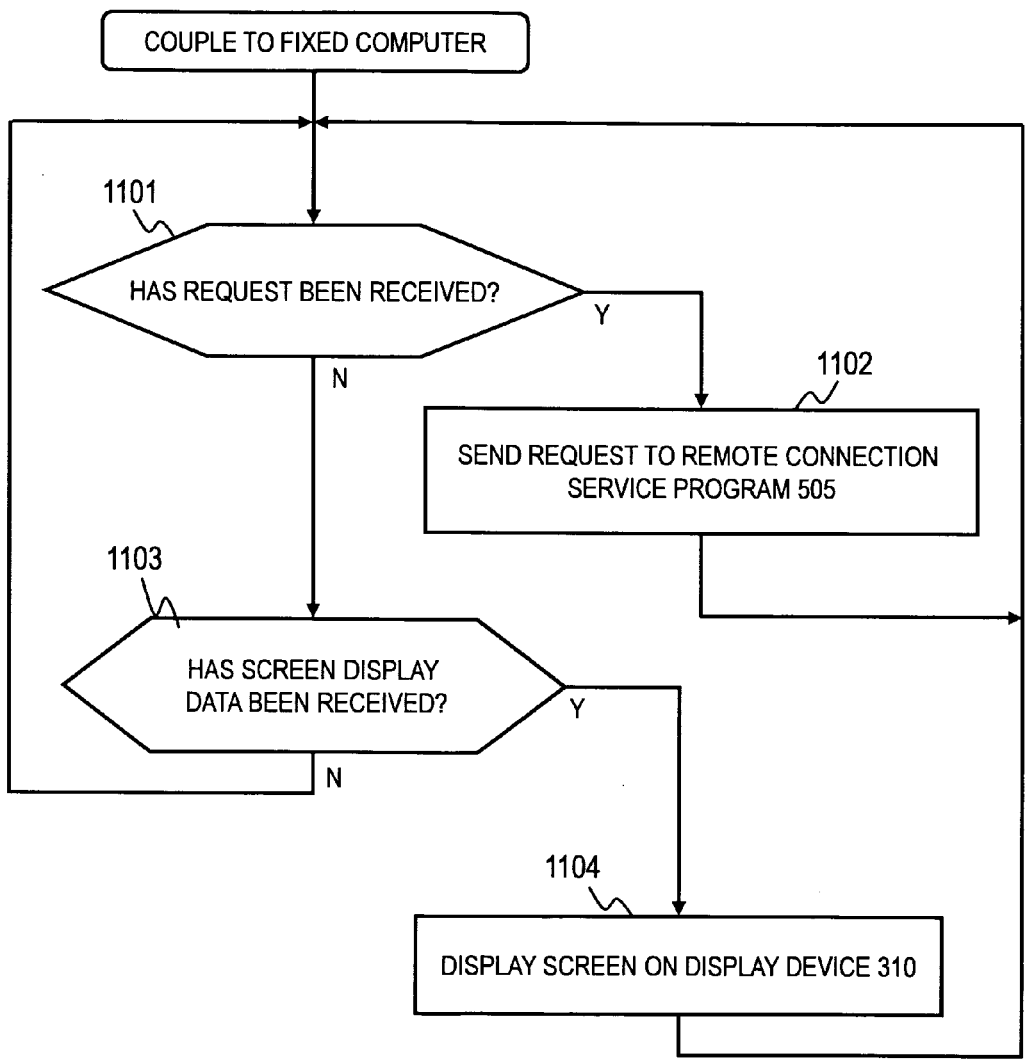
FIG. 9 is a flowchart showing an example of a flow of processing of a remote connection client program in accordance with the first embodiment of this invention.

FIG. 9 is a flowchart showing an example of a flow of processing of the remote connection client program 307.

When a connection to the remote connection service program 505 of the fixed computer 500 has been established, the remote connection client program 307 of the mobile terminal 300 enters a state of waiting for an input via the input interface 303 and for screen display data from the remote connection service program 505. When a request is received through the input interface 303 (Step 1101), the remote connection client program 307 sends the request to the remote connection service program 505 (Step 1102). When screen display data is received from the remote connection service program 505 (Step 1103), the remote connection client program 307 sends the screen display data to the graphic control device 305 to display the screen display data on the display device 310 (Step 1104).

Figure 10:
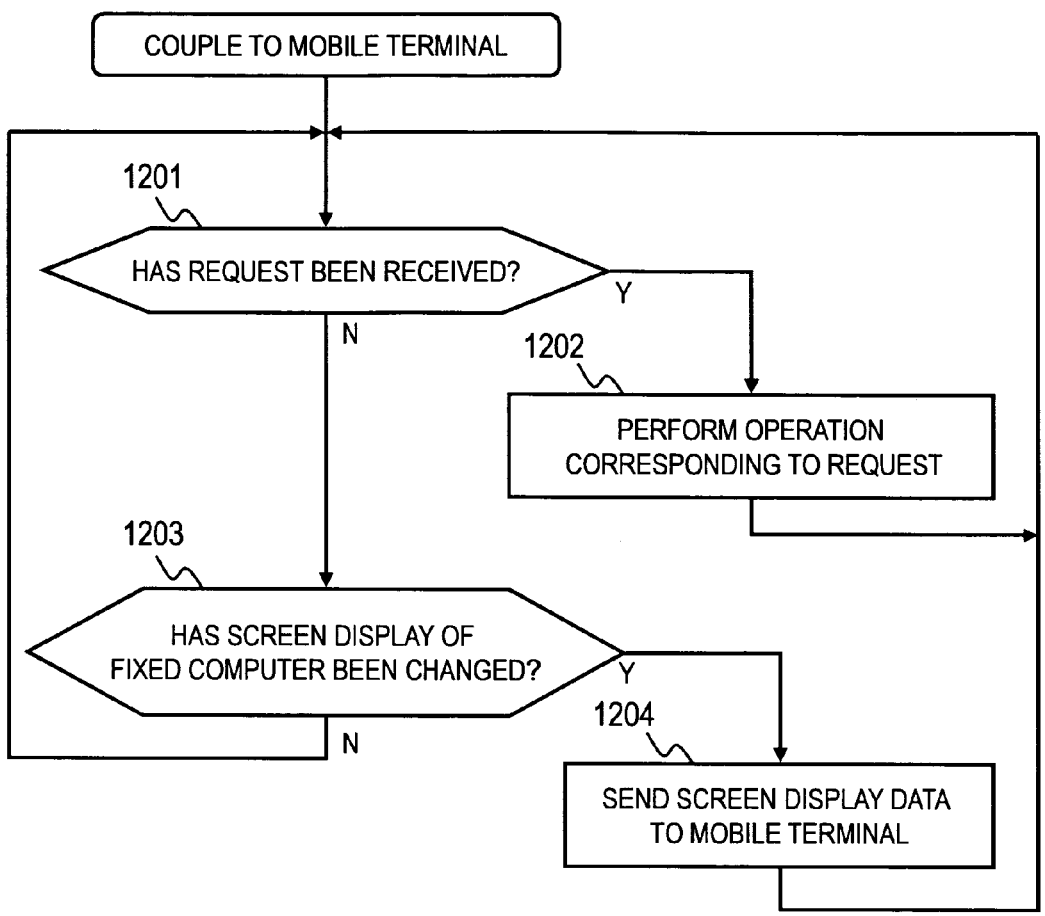
FIG. 10 is a flowchart showing an example of a flow of processing of a remote connection service program in accordance with the first embodiment of this invention.

FIG. 10 is a flowchart showing an example of a flow of processing of the remote connection service program 505 of the fixed computer 500. When a connection to the remote connection client program 307 of the mobile terminal 300 has been established, the remote connection service program 505 enters a state of waiting for a request inputted through the input interface 303 and sent from the remote connection client program 307, and for a change in screen display of the fixed computer 500. Upon reception of the request sent from the remote connection client program 307 (Step 1201), the remote connection service program 505 performs an operation corresponding to the received request (Step 1202). When the screen display of the fixed computer 500 has been changed (Step 1203), the remote connection service program 505 sends the screen display data to the remote connection client program 307 (Step 1204).

Figure 11:
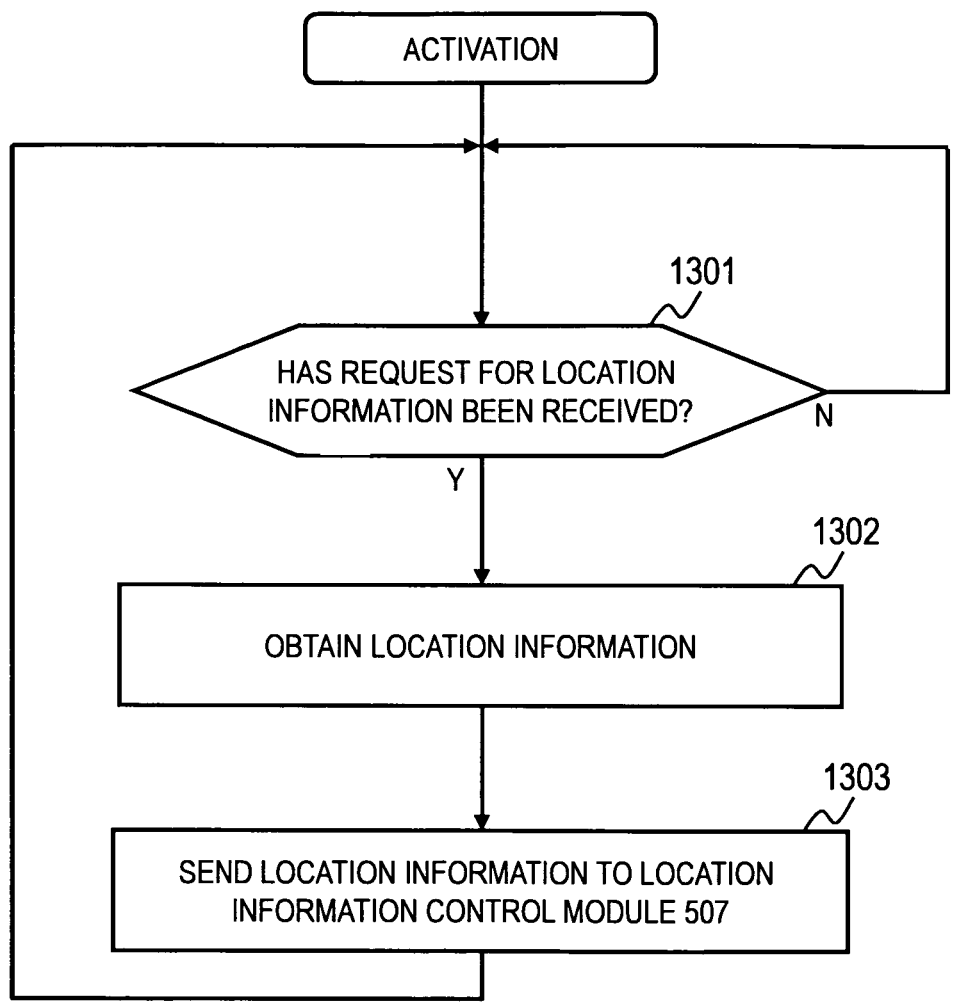
FIG. 11 is a flowchart showing an example of a flow of processing of a location information transmission program in accordance with the first embodiment of this invention.

FIG. 11 is a flowchart showing an example of a flow of processing of the location information transmission program 308 of the mobile terminal 300.

The location information transmission program 308 is in a state of waiting for a request for the location information of the mobile terminal 300 from the location information control module 507 of the web browser program 506. When a request for the location information is received (Step 1301), the location information transmission program 308 measures the location of the mobile terminal 300 with the use of the location measurement device 311 to obtain the country name corresponding to the measurement result, as the location information (Step 1302). It should be noted that, in this embodiment, the country name is used as the location information, but measurement data measured with the location measurement device 311 or information of an area corresponding to the measurement data may also be used. Next, the location information transmission program 308 sends the location information to the location information control module 507 of the web browser program 506, which has requested to send the location information (Step 1303).

Figure 12:
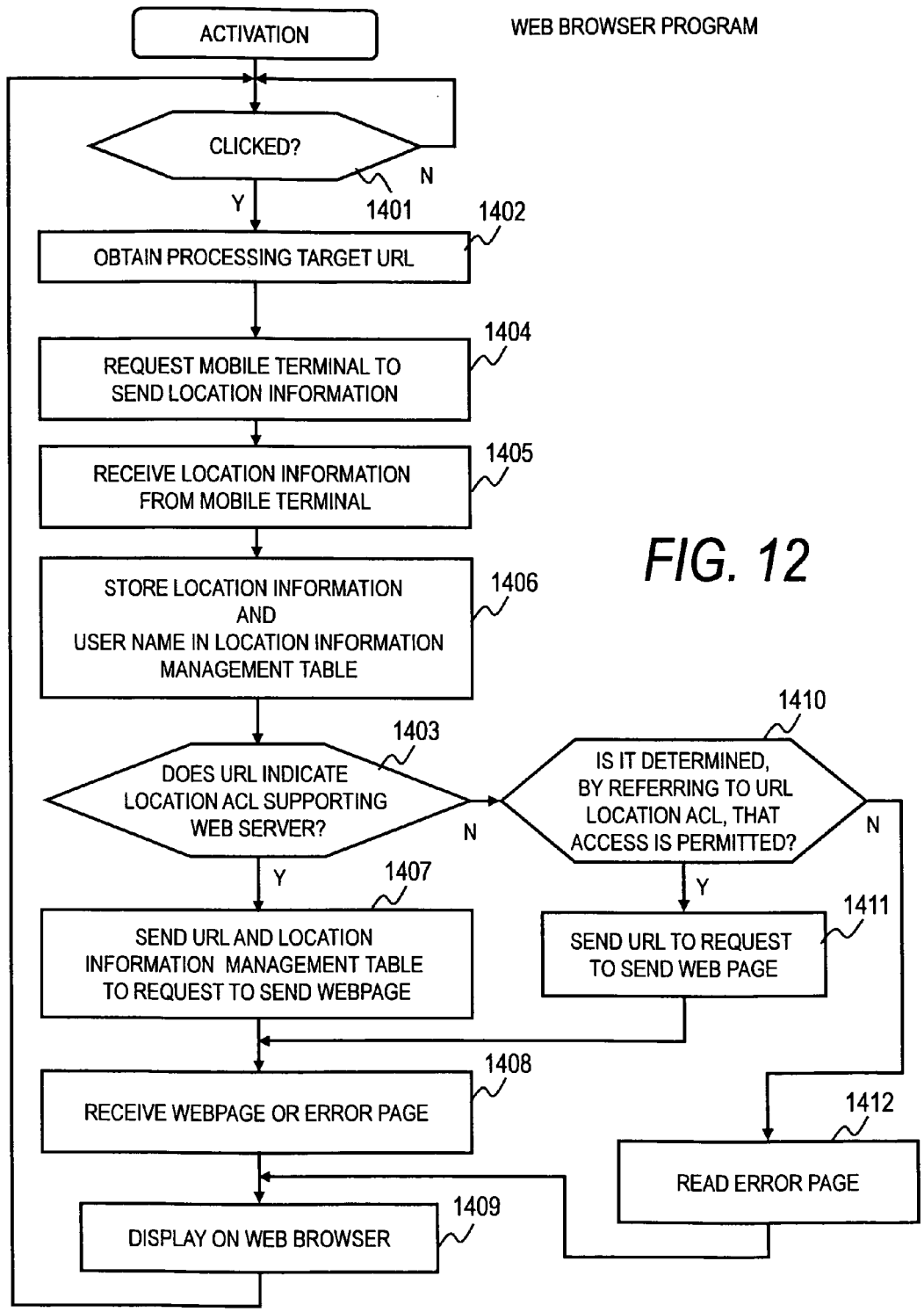
FIG. 12 is a flowchart showing an example of a flow of processing of a web browser program in accordance with the first embodiment of this invention.

FIG. 12 is a flowchart showing an example of a flow of processing of the web browser program 506 of the fixed computer 500.

The web browser program 506 is executed by the CPU 501 and enters a state of waiting for an input via the input interface 303. When a URL has been specified by a click operation or the like from the mobile terminal 300 (Step 1401), the web browser program 506 obtains the specified URL (Step 1402).

The location information control module 507 of the web browser program 506 requests the location information transmission program 308 to send the location information of the mobile terminal 300 (Step 1404). When the location information of the mobile terminal 300 is received from the location information transmission program 308 (Step 1405), the location information control module 507 stores the location information and the name of a user who has logged in the fixed computer 500, in the location information management table 508 (Step 1406).

The web browser program 506 determines whether the obtained URL indicates the location ACL supporting web server by referring to the location ACL supporting web server management table 510 (Step 1403).

When the obtained URL indicates the location ACL supporting web server, the location information control module 507 requests the location ACL supporting web server 900 (the function realized when the CPU 901 executes the web service program 905) to send the webpage indicated by the specified URL, by sending the specified URL and the location information management table 508 (Step 1407). When the webpage indicated by the specified URL and generated by the web service program 905 is received (Step 1408), the location information control module 507 displays the received webpage on the web browser (Step 1409).

When the obtained URL does not indicate the location ACL supporting web server, in Step 1403, the location information control module 507 compares the URL location ACL 509 with the specified URL and the location information management table 508, to check whether the user who has logged in the fixed computer 500 is a user permitted to access the specified URL and whether the mobile terminal 300 is located in an access-permitted location, so as to determine whether the specified URL is accessible (Step 1410). It should be noted that whether the specified URL is accessible may be controlled by whether the user is an access-permitted user or whether the mobile terminal 300 is located in an access-permitted location.

When the specified URL is accessible, the web browser program 506 requests the web server 105 which does not support the location ACL, to send the webpage (Step 1411). When the specified URL is not accessible, the web browser program 506 reads an error page indicating that access is not permitted (Step 1412) and displays the error page on the web browser (Step 1409).

Figure 13:
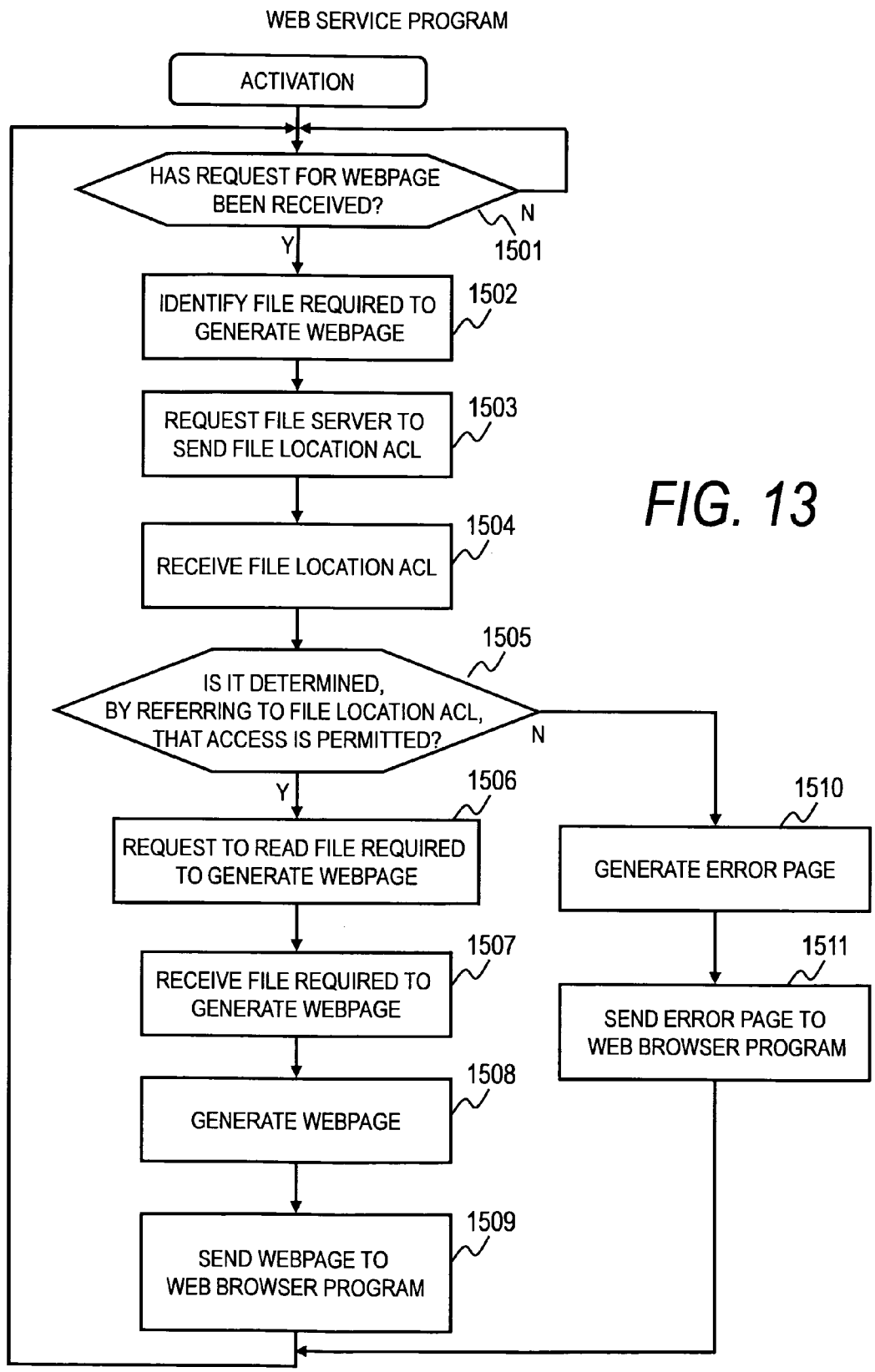
FIG. 13 is a flowchart showing an example of a flow of processing of a web service program in accordance with the first embodiment of this invention.

FIG. 13 is a flowchart showing an example of a flow of processing of the web service program 905 of the web server 900 which supports the location ACL.

The web service program 905 is in a state of waiting for a request for the webpage from the web browser program 506. When a request for the webpage is received from the web browser program 506 (Step 1501), the web service program 905 identifies the file required to generate the requested webpage (Step 1502).

The location access control module 906 of the web service program 905 requests the file server 108 to send the file location ACL 109 corresponding to the identified file (Step 1503) and receives the file location ACL 109 sent from the file server 108 (Step 1504). The location access control module 906 refers to the file location ACL 109 received from the file server 108 and the location information management table 508 received from the web browser program 506, compares the access-permitted user 1092 corresponding to the file name 1091 with the user who has logged in the fixed computer 500, and compares the access-permitted location 1093 corresponding to the file name 1091 with the mobile terminal location information 5082, to determine whether the file used to generate the webpage is accessible (Step 1505). Whether the file is accessible may be controlled by both or either of the determination of an access-permitted user and the determination of an access-permitted location.

When the file is accessible, the web service program 905 requests the file server 108 to send the identified file (Step 1506) and obtains the file (Step 1507). The web service program 905 uses the obtained file to generate the webpage (Step 1508) and sends the generated webpage to the web browser program 506 which has requested the webpage (Step 1509).

When the file is not accessible, in Step 1505, the web service program 905 generates an error page indicating that access is not permitted (Step 1510) and sends the error page to the web browser program 506 (Step 1511). When the webpage is composed of a plurality of files, a case where one file is accessible whereas another file is not accessible may occur depending on the content of the file location ACL 109. In this case, the following methods of outputting error information can be used: a method in which error information indicating that the webpage cannot be generated is outputted when a part of the files is not accessible; and a method in which the webpage is generated by using only an accessible file and error information indicating that a part of the webpage cannot be displayed is outputted.

In the above-described processing, the file location ACL (which is file data) and actual file data are just stored in the file server, and thus, the file server does not particularly need to have a new function. The point is that the location ACL supporting web server accesses a file according to the access restriction specified in the file location ACL received from the file server. It should be noted that a configuration can be made in which the web server 900 holds the file location ACL from the beginning. In this case, the web server 900 does not need to request to send the file location ACL, so the processing of the file server is reduced. Meanwhile, a storage area to store the location ACL needs to be secured in the memory of the web server 900.

Figure 14:
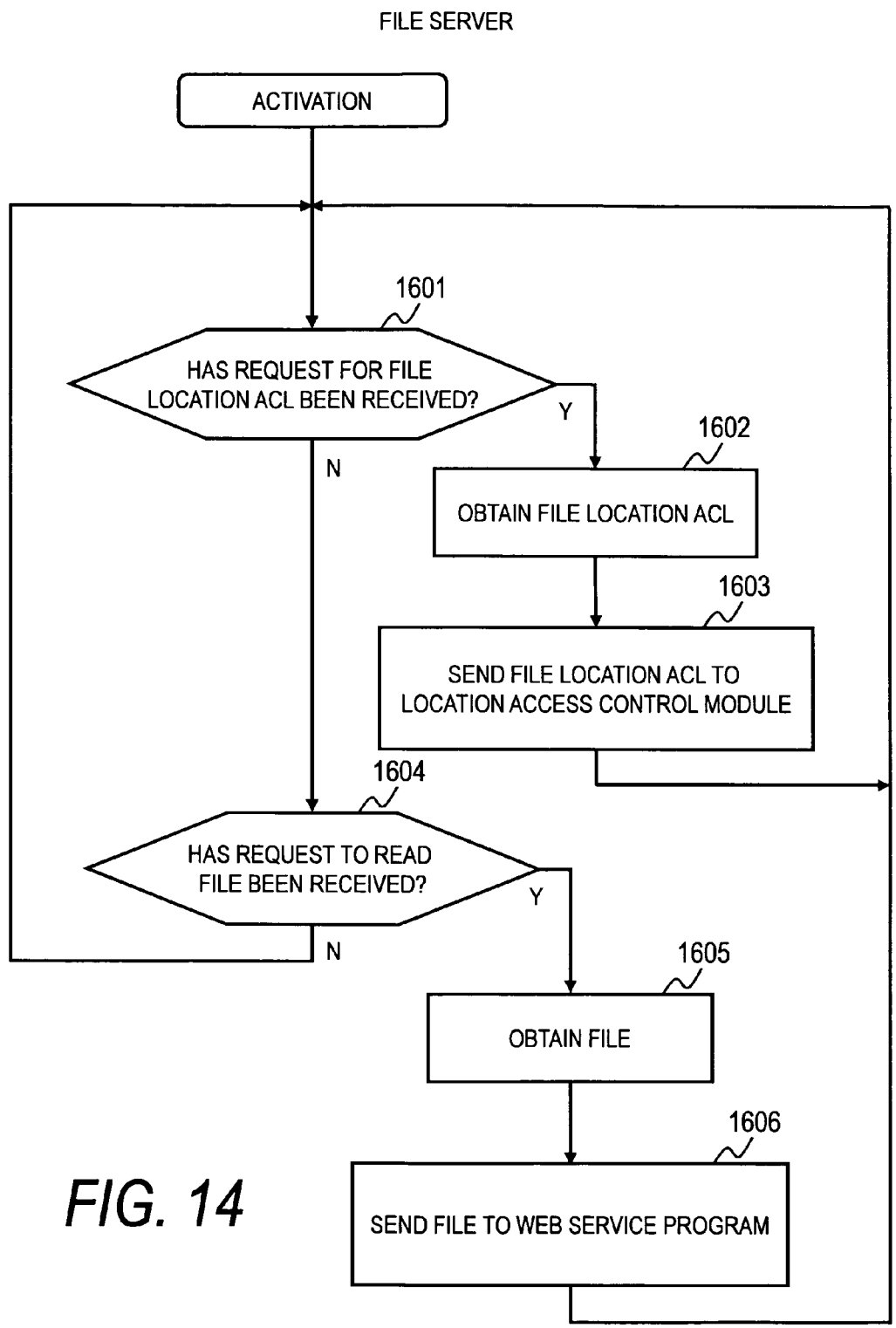
FIG. 14 is a flowchart showing an example of a flow of processing of a file server in accordance with the first embodiment of this invention.

FIG. 14 is a flowchart showing an example of a flow of processing of the file server 108.

The file server 108 is in a state of waiting for a request for the file location ACL 109 from the location access control module 906 of the web service program 905 and for a request for a file from the web service program 905. When a request for the file location ACL 109 is received from the location access control module 906 (Step 1601), the file server 108 obtains the file location ACL 109 (Step 1602) and sends the file location ACL 109 to the location access control module 906 (Step 1603). When a request to read a file is received from the web service program 905 (Step 1604), the file server 108 obtains the file (Step 1605) and sends the file to the web service program 905 (Step 1606).

Figure 15:
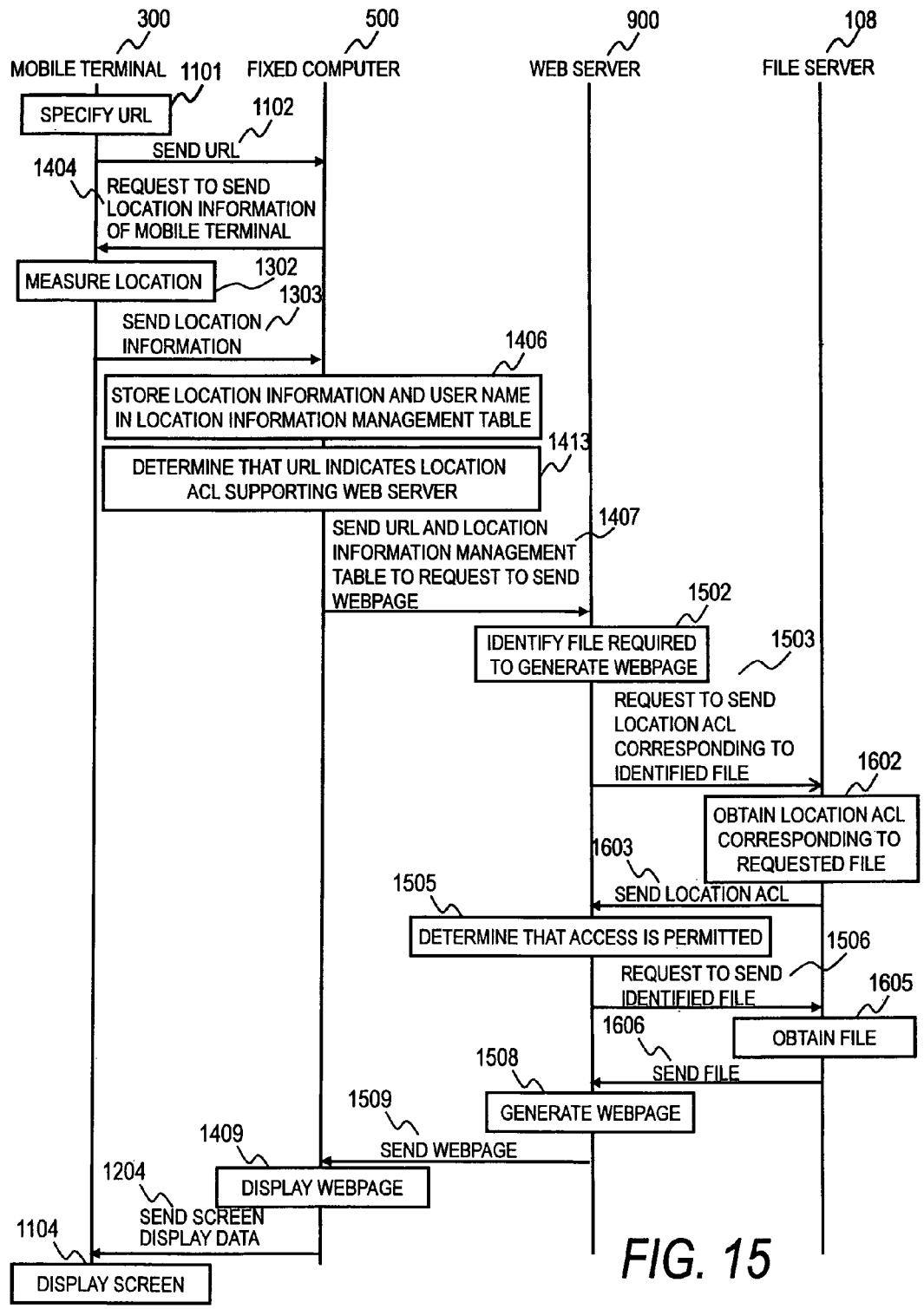
FIG. 15 is a sequence diagram showing an example of a flow of an entire processing of the first embodiment of this invention, performed when an access destination is the web server which supports a location ACL.

FIG. 15 is a sequence diagram showing an example of a flow of the entire processing of the first embodiment of this invention, performed when the access destination is the web server 900, which supports the location ACL.

When a URL is specified through the input interface 303 of the mobile terminal 300 (Step 1101), the remote connection client program 307 of the mobile terminal 300 sends the specified URL to the remote connection service program 505 of the fixed computer 500 (Step 1102). When the remote connection service program 505 receives the specified URL, the web browser program 506 of the fixed computer 500 requests the location information transmission program 308 of the mobile terminal 300 to send the location information of the mobile terminal 300 (Step 1404).

The location measurement device 311 of the mobile terminal 300 measures the location of the mobile terminal 300 (Step 1302), and the location information transmission program 308 sends the location information to the web browser program 506 of the fixed computer 500 (Step 1303). It should be noted that, when the mobile terminal 300 and the fixed computer 500 make up a new URL transmission arrangement, the location information of the mobile terminal 300 can be sent when the URL is sent. Specifically, Step 1302 is performed after Step 1101, and the location information of the mobile terminal 300 is sent when the URL is sent in Step 1102. In this case, Steps 1404 and 1303 are omitted to reduce the number of transfer messages, so the load of the network is effectively reduced and the communication procedure is simplified.

The web browser program 506 of the fixed computer 500 stores the received location information and the name of the user who has logged in the fixed computer 500 in the location information management table 508 (Step 1406). It is assumed that the user name is received from the mobile terminal 300 when the mobile terminal 300 logs in the fixed computer 500. The web browser program 506 determines whether the specified URL indicates the location ACL supporting web server. When the specified URL indicates the location ACL supporting web server (Step 1403), the web browser program 506 sends the specified URL and the content of the location information management table 508 to the web service program 905 of the web server 900 and requests the web service program 905 to send the webpage indicated by the specified URL (Step 1407).

When the request is received from the web browser program 506 of the fixed computer 500, the web service program 905 of the web server 900 identifies the file used to generate the webpage indicated by the specified URL (Step 1502), and requests the file server 108 to send the file location ACL 109 corresponding to the identified file (Step 1503).

When the request is received from the web service program 905 of the web server 900, the file server 108 obtains the file location ACL 109 corresponding to the identified file (Step 1602) and sends the file location ACL 109 to the web service program 905 (Step 1603).

When the file location ACL 109 is received from the file server 108, the web service program 905 of the web server 900 refers to the file location ACL 109 and the location information management table 508 received from the web browser program 506. When it is determined that the identified file is accessible (Step 1505), the web service program 905 requests the file server 108 to send the identified file (Step 1506).

When the request is received, the file server 108 obtains the identified file (Step 1605) and sends the obtained file to the web service program 905 of the web server 900 (Step 1606).

The web service program 905 of the web server 900 uses the received file to generate the webpage (Step 1508) and sends the generated webpage to the web browser program 506 of the fixed computer 500 (Step 1509).

When the web browser program 506 of the fixed computer 500 displays the received webpage on the screen (Step 1409), the remote connection service program 505 of the fixed computer 500 detects the change in screen display and sends the screen display data to the remote connection client program 307 of the mobile terminal 300 (Step 1204).

When the screen display data is received from the remote connection service program 505, the remote connection client program 307 of the mobile terminal 300 displays the webpage on the display device 310 (Step 1104).

Figure 16:
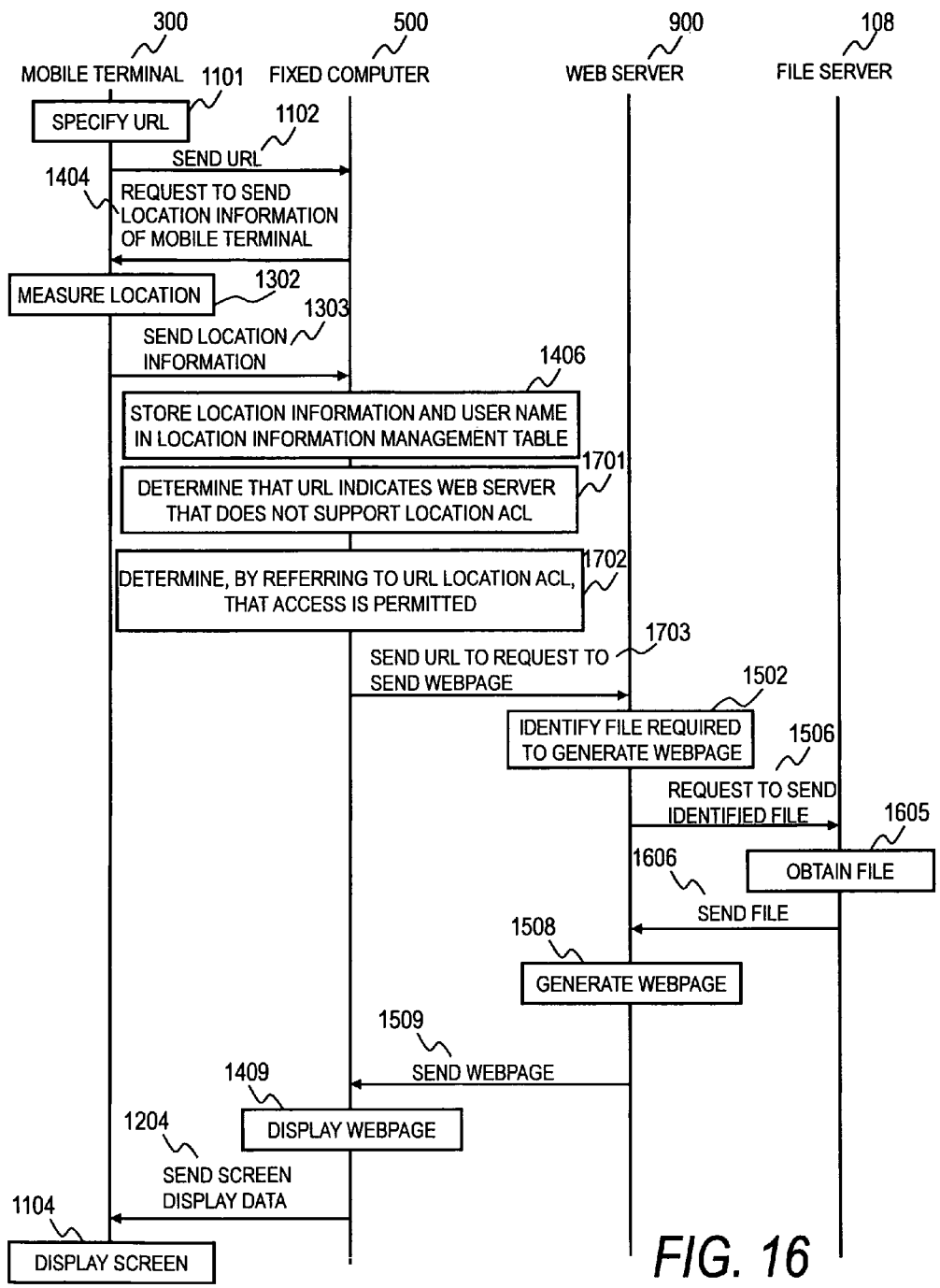
FIG. 16 is a sequence diagram showing an example of a flow of an entire processing of the first embodiment of this invention, performed when an access destination is the web server which does not support a location ACL.

FIG. 16 is a sequence diagram showing an example of a flow of the entire processing of the first embodiment of this invention, performed when the access destination is the web server 105 which does not support the location ACL.

Steps 1101 to 1406 shown in FIG. 16 are the same as those shown in FIG. 15.

In FIG. 16, the web browser program 506 of the fixed computer 500 determines whether the specified URL indicates the location ACL supporting web server. When it is determined that the specified URL indicates the web server that does not support the location ACL (Step 1701), the web browser program 506 refers to the location information management table 508 and the URL location ACL 509 held by the fixed computer 500 to determine whether the specified URL is accessible. When it is determined that the specified URL is accessible (Step 1702), the web browser program 506 sends the specified URL to the web service program 905 of the web server 900 to request the web service program 905 to send the webpage indicated by the specified URL (Step 1703).

When the request is received from the web browser program 506, the web service program 905 of the web server 900 identifies the file used to generate the webpage (Step 1502) and requests the file server 108 to send the identified file (Step 1506).

When the request is received, the file server 108 obtains the identified file (Step 1605) and sends the obtained file to the web service program 905 of the web server 900 (Step 1606).

Operations that follow the Step 1606 are the same as those of the sequence diagram of FIG. 15.

It should be noted that the location information management table 508 is held in the fixed computer 500 in this embodiment, but a configuration may be made in which the location information management table 508 is stored in the management server 110, which specifies the information of the location information management table 508, and the fixed computer 500 inquires about the information. Compared with a case where there are a plurality of fixed computers and each of the plurality of fixed computers has the location information management table, the location information management table just needs to be managed at one place in the management server, and thus, the management is simplified.

According to the embodiment described above, in a case where the mobile terminal 300 is located at a location where access is not permitted, when the location information of the mobile terminal 300 is sent from the fixed computer 500 to the web server 900, the web server 900 can determine that access to a webpage is not permitted, by using the file location ACL, and provide information operation means based on information leak prevention and restriction.

As another embodiment, it is possible that, when the web server sends a webpage to the fixed computer, access information on the location that corresponds to the file referred to when the webpage is generated is also sent, and the fixed computer performs access control based on the location information of the mobile terminal.

As still another embodiment, it is possible that the mobile terminal periodically sends the location information of the mobile terminal to the fixed computer, such that the fixed computer obtains the location information of the mobile terminal.

Second Embodiment

A second embodiment shows an example in which the location information is stored in a file access request and sent to a file server 2108, and the file server 2108 performs file access control by using a file location ACL 2107. The difference between the first embodiment and the second embodiment of this invention will be mainly described.

Figure 17:
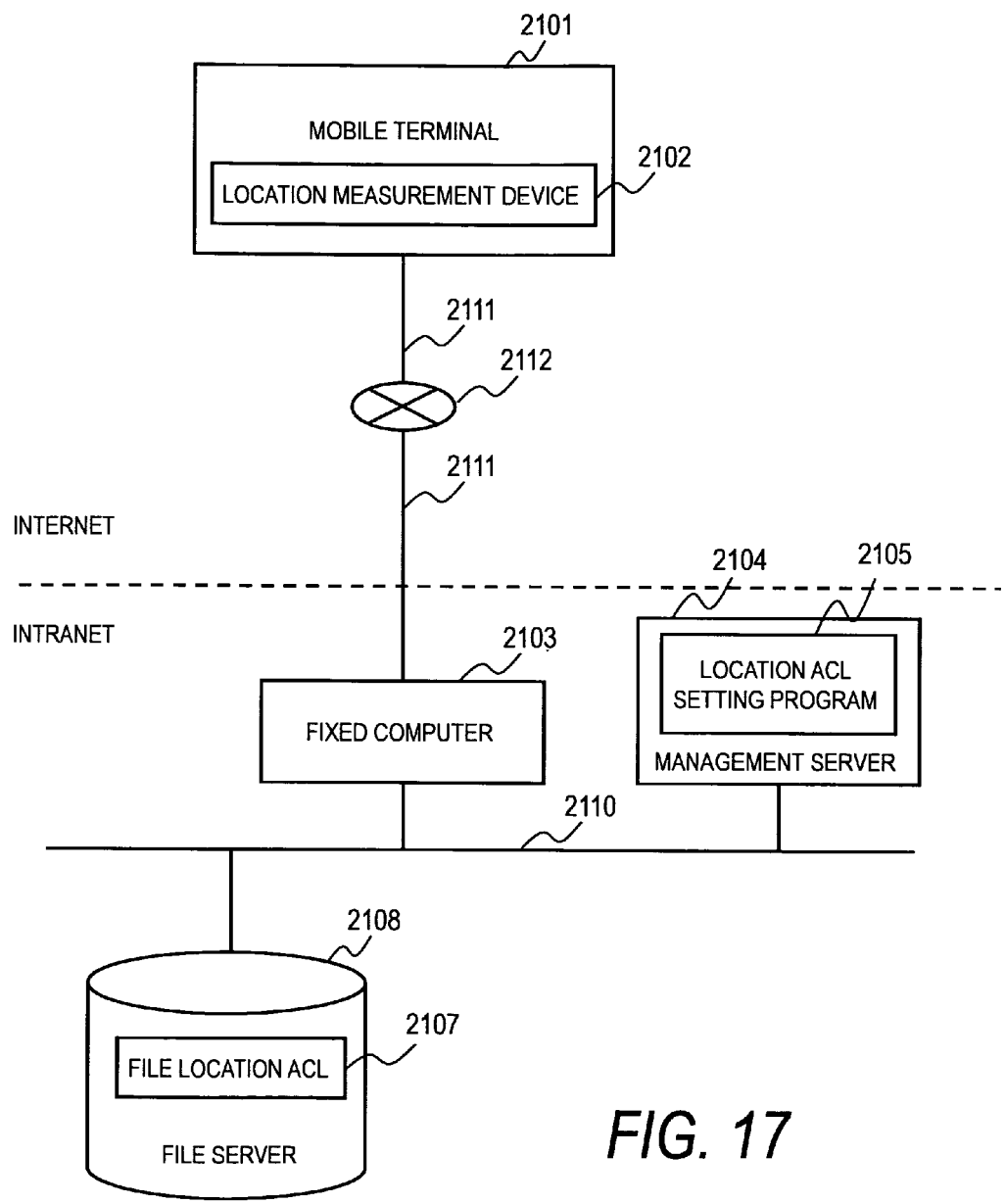
FIG. 17 is a block diagram showing a configuration example of a computer system in accordance with a second embodiment of this invention.

FIG. 17 shows a configuration example of a computer system according to the second embodiment of this invention.

A mobile terminal 2101 which has a location measurement device 2102 logs in a fixed computer 2103 that is coupled to the mobile terminal 2101 through a network 2112 and through an access line 2111 coupling to the network. After the mobile terminal 2101 logs in the fixed computer 2103, the fixed computer 2103 requests, through a communication line 2110, the file server 2108 to send a file requested (specified with the identifier which identifies the file) by the mobile terminal 2101. The file server 2108 includes the file location ACL 2107. When a file request that contains the location information of an access source is received, the file server 2108 refers to the file location ACL 2107, determines whether to send a requested file in response to the file request, and sends the file depending on the determination result. A management server 2104 which is coupled to the fixed computer 2103 and the file server 2108 through the communication line 2110 includes a location ACL setting program 2105 and sets the file location ACL 2107 included in the file server 2108.

Figure 18:
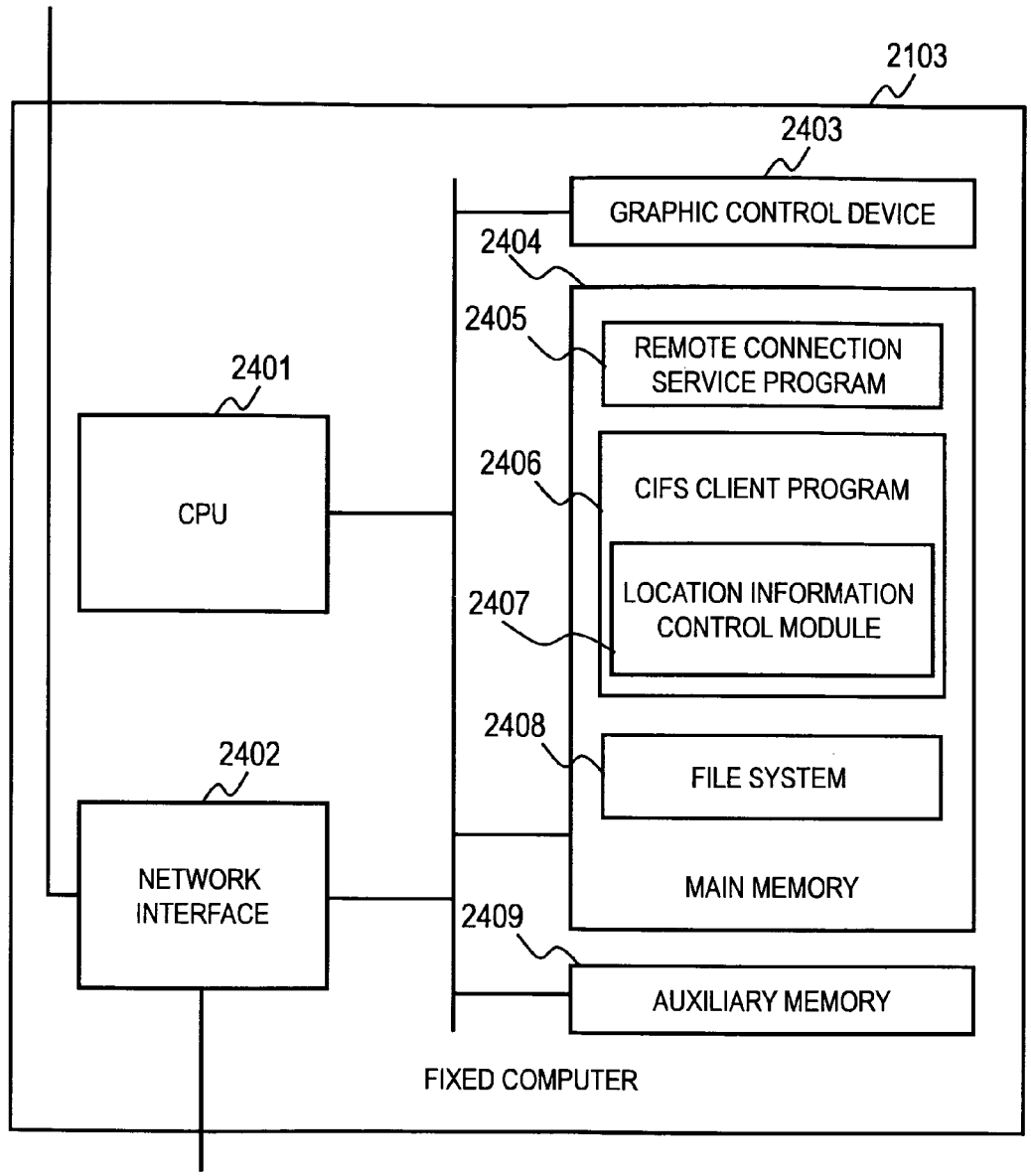
FIG. 18 is a block diagram showing a configuration example of a fixed computer in accordance with the second embodiment of this invention.

FIG. 18 shows a configuration example of the fixed computer 2103 according to the second embodiment of this invention.

A CPU 2401 executes a remote connection service program 2405, a common interface file system (CIFS) client program 2406, and a file system 2408. A main memory 2404 stores the remote connection service program 2405, the CIFS client program 2406 which includes a location information control module 2407, and the file system 2408. The file system 2408 is software for exchanging data in units of files, and is, for example, Windows (Windows is a registered trademark of Microsoft corporation in the United States and other countries). The file system 2408 uses a communication protocol called CIFS in order to communicate with the file server 2108. The CIFS client program 2406 is used to request a CIFS service program 2506 of the file server 2108 to open, read, or write a file. The location information control module 2407 obtains the location information of the mobile terminal 2101 from the location information transmission program 308 and passes the obtained location information to the CIFS client program 2406.

Figure 19:
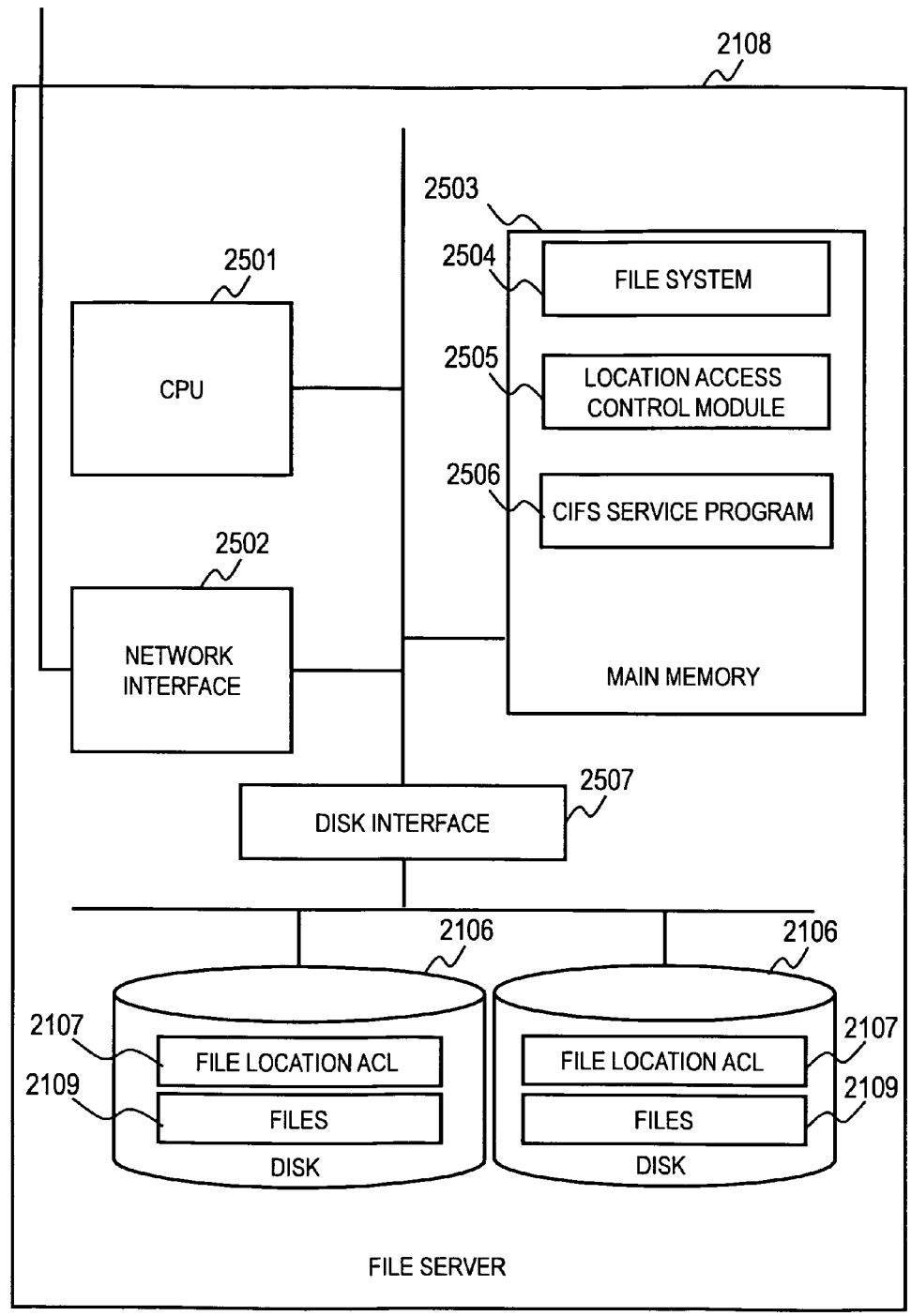
FIG. 19 is a block diagram showing a configuration example of a f file server in accordance with the second embodiment of this invention.

FIG. 19 shows a configuration example of the file server 2108 according to the second embodiment of this invention.

A CPU 2501 executes a file system 2504, a location access control module 2505, and the CIFS service program 2506. A main memory 2503 includes the file system 2504, the location access control module 2505, and the CIFS service program 2506. The file system 2504 is software for exchanging data in units of files, and is, for example, XFS (XFS is a registered trademark of Silicon Graphics, Inc.). The location access control module 2505 obtains the file location ACL 2107, compares the file location ACL 2107 with the file name of a file that the fixed computer 2103 requests to access, such as open, read, or write, and the location information of the mobile terminal 2101, and determines whether access to the file is permitted. The CIFS service program 2506 receives a file access request from the CIFS client program 2406. A disk interface (IF) 2507 is used when the file system 2504 exchanges data with a disk 2106. The disk 2106 stores files 2109 and the file location ACL 2107. The file location ACL 2107 is provided for each disk in FIG. 19, but the file location ACL 2107 may be stored in a particular disk in the file server 2108. In this case, the management becomes easy, but, when access to the disk having the file location ACL 2107 is concentrated, the response to the access may be slower.

FIG. 20 shows the file location ACL 2107 according to the second embodiment.

A file name 2601 indicates the name of a file (ID identifying the file) stored in the disk 2106. An access-permitted location 2602 indicates the location of the mobile terminal 2101, where access to the file indicated by the file name 2601 is permitted. When XFS is used, for example, implementation can be made by storing the access-permitted location 2602 in an extended attribute. The default value of the access-permitted location 2602 is "*" which indicates that access is permitted from anywhere.

Figure 21:
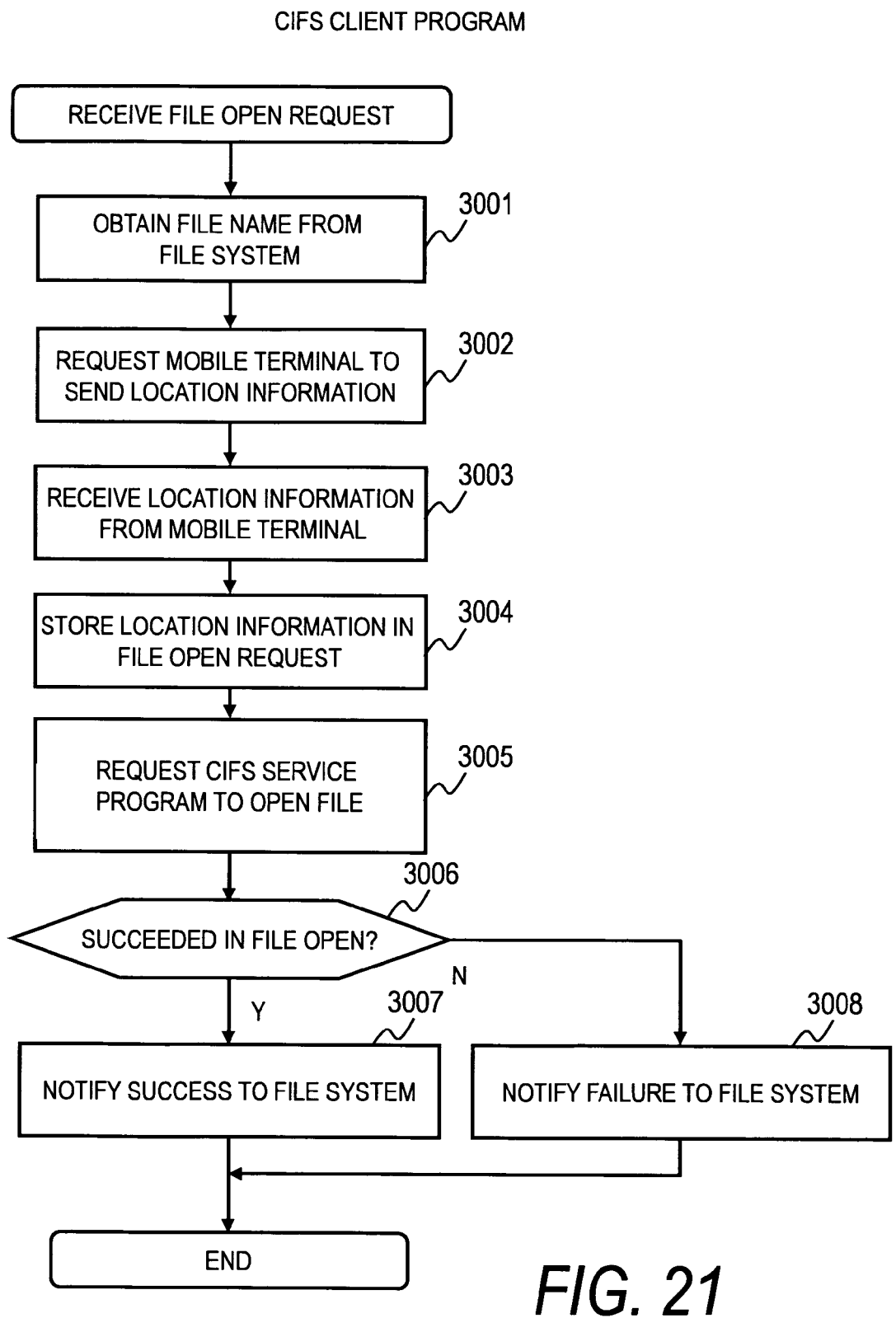
FIG. 21 is a flowchart showing an example of a flow of processing of a CIFS client program in accordance with the second embodiment of this invention.

FIG. 21 is a flowchart showing an example of a flow of processing of the CIFS client program 2406.

When a file open request is received from the file system 2408 of the fixed computer 2103, the CIFS client program 2406 performs file open processing to send a file open request to the file server 2108. Specifically, the CIFS client program 2406 obtains the name of a file to be opened, from the file system 2408 (Step 3001). Next, the CIFS client program 2406 requests the location information transmission program 308 of the mobile terminal 2101 to send the location information of the mobile terminal 2101 (Step 3002) and obtains the location information (Step 3003). The CIFS client program 2406 stores the obtained file name and location information in the file open request (Step 3004). The location information is stored in a reserved area of the file open request. Next, the CIFS client program 2406 sends the file open request to the CIFS service program 2506 (Step 3005). The CIFS client program 2406 receives a result of the file open request, from the CIFS service program 2506. When the result indicates a success in the file open (Y in Step 3006), the CIFS client program 2406 notifies the success to the file system 2408 (Step 3007). When the result indicates a failure in the file open (N in Step 3006), the CIFS client program 2406 notifies the failure to the file system 2408 (Step 3008).

Figure 22:
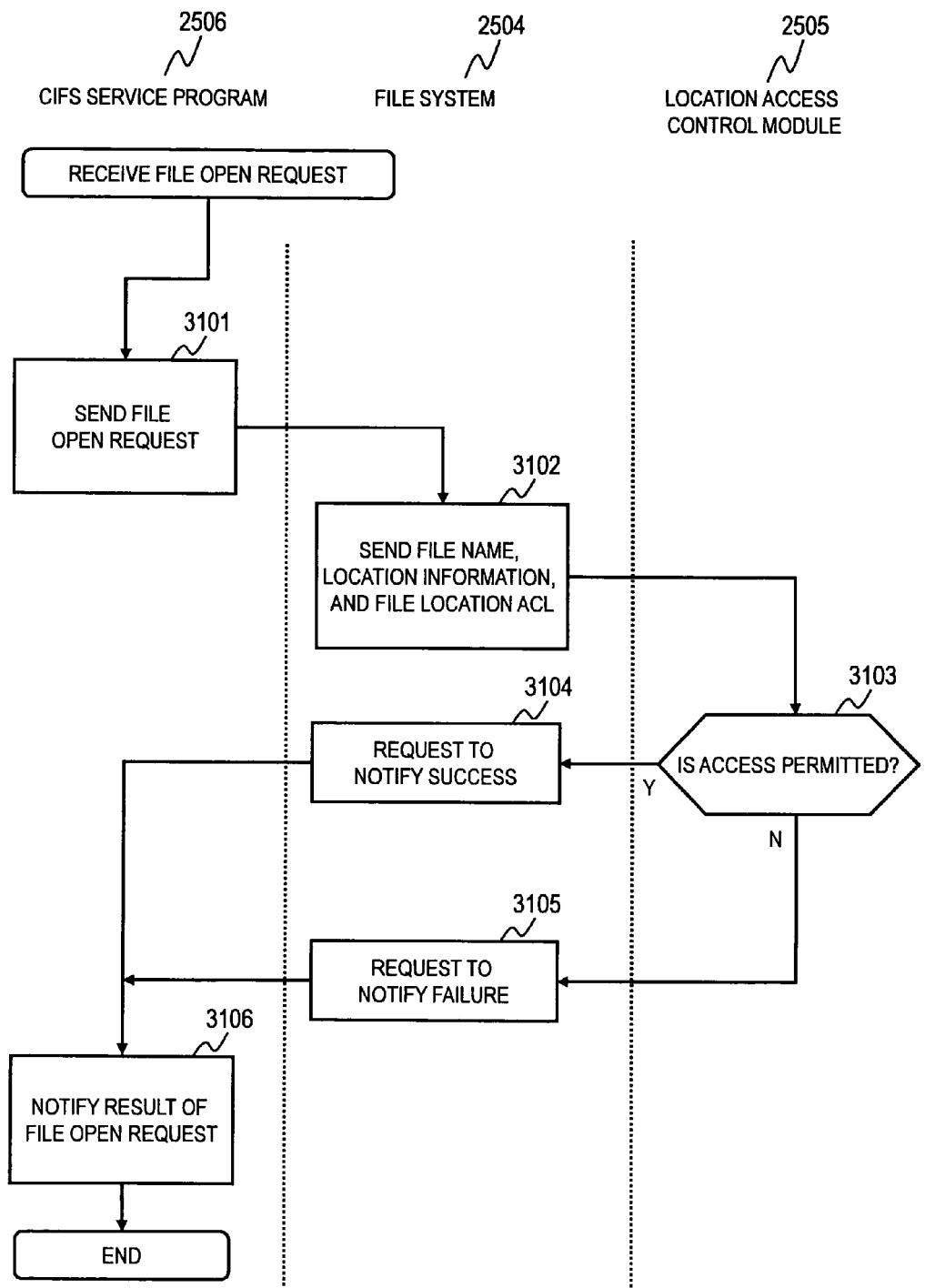
FIG. 22 is a flowchart showing an example of a flow of processing of a file server in accordance with the second embodiment of this invention.

FIG. 22 is a flowchart showing an example of a flow of processing of the file server 2108.

Specifically, a description will be given of an example of a flow of processing of the CIFS service program 2506, the file system 2504, and the location access control module 2505, which are included in the file server 2108.

After a file open request is received from the CIFS client program 2406, the CIFS service program 2506 sends the file open request to the file system 2504 (Step 3101). The file system 2504 obtains the file name and the location information from the file open request. Further, the file system 2504 obtains the file location ACL 2107. The file system 2504 sends the obtained file name, location information, and file location ACL 2107 to the location access control module 2505 (Step 3102). The location access control module 2505 compares the file name and the location information with the file location ACL 2107 to determine whether access to the corresponding file is permitted (Step 3103). When the file name 2601 of the file location ACL 2107 matches the name of the file requested to be opened and the access-permitted location 2602 corresponding to the name of the requested file matches the location information, the location access control module 2505 notifies that access to the file is permitted, to the file system 2504. When the file name 2601 of the file location ACL 2107 does not match the name of the file requested to be opened and the access-permitted location 2602 corresponding to the name of the requested file does not match the location information, the location access control module 2505 notifies that access to the file is permitted, the location access control module 2505 notifies that access to the file is not permitted, to the file system 2504. When access to the file is permitted, the file system 2504 requests the CIFS service program 2506 to notify a success in the file open to the file system 2408 (Step 3104). When access to the file is not permitted, the file system 2504 requests the CIFS service program 2506 to notify a failure in the file open to the file system 2408 (Step 3105). The CIFS service program 2506 notifies the result of the file open request to the CIFS client program 2406 (Step 3106).

According to the embodiment described above, when the mobile terminal 2101 is located in a location where access is not permitted, the fixed computer 2103 sends the location information of the mobile terminal 2101 to the file server 2108. As a result, the file server 2108 can determine that access to a requested file is not permitted, by using the file location ACL, and information leak can be prevented.

Third Embodiment

In a third embodiment of this invention, the location information of a mobile terminal 4101 which has a location measurement device 4102 is periodically sent from a fixed computer 4103 to a file server 4106, and the file server 4106 performs file access control by using a keyword-based location ACL 4109 (which will be described in detail later), without changing the file access request. The difference between the second embodiment and the third embodiment of this invention will be mainly described. It should be noted that the mobile terminal 4101 is coupled to the fixed computer 4103 through a communication line 4121 and a network 4122, and the fixed computer 4103, the file server 4106, a search server 4111, and a management server 4104 are coupled through a communication line 4120.

Figure 23:
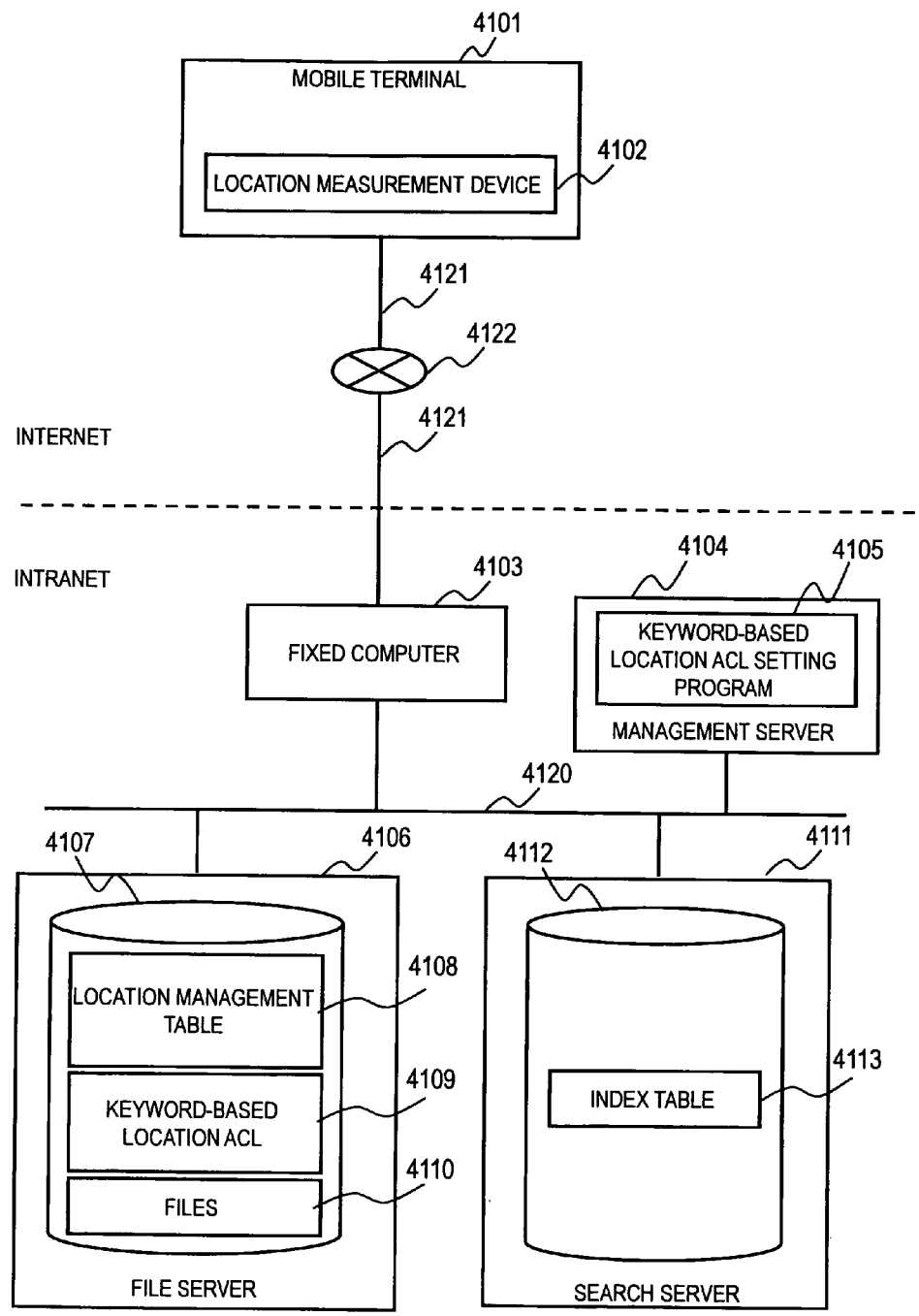
FIG. 23 is a block diagram showing a configuration example of a computer system in accordance with a third embodiment of this invention.

FIG. 23 shows a configuration example of a computer system according to the third embodiment of this invention.

The management server 4104 includes a keyword-based location ACL setting program 4105 used to set a keyword-based location ACL 4109. The keyword-based location ACL 4109 contains no data at the initial state. In order to set the keyword-based location ACL 4109 of the file server 4106, the keyword-based location ACL setting program 4105 first reads the current setting of the keyword-based location ACL 4109 from the file server 4106. When the keyword-based location ACL 4109 is empty, no data is read. Next, the administrator performs required setting. After the setting of the administrator is finished, the keyword-based location ACL setting program 4105 sends information of the set keyword-based location ACL 4109 to the file server 4106 to finish the setting of the keyword-based location ACL 4109. In a disk 4107 of the file server 4106, a location management table 4108, the keyword-based location ACL 4109, and files 4110 are stored. In a disk 4112 of the search server 4111, an index table 4113 is stored.

The search server 4111 periodically refers to the files 4110 of the file server 4106, generates a list of keywords contained in each file of the files 4110, and generates the index table 4113. This processing of the search server 4111 is called index table generation processing.

The fixed computer 4103 uses the IP address of the file server 4106, which has been notified in advance from the administrator, to send the location information of the mobile terminal 4101 and the IP address of the fixed computer 4103 to the file server 4106.

FIG. 24 shows a configuration example of the location management table 4108 according to the third embodiment of this invention. The location management table 4108 sores the relationships between the locations of a mobile terminal that remotely operates fixed computers and the IP addresses of the fixed computers remotely operated by the mobile terminal. The location management table 4108 is used to specify the location of the mobile terminal 4101 which remotely operates the fixed computer 4103 and instructs the fixed computer 4103 to send a file access request. The file access request contains the IP address of the fixed computer 4103 serving as the transmission source. Specifically, the IP address of the transmission source is contained in the IP packet of the file access request. Accordingly, when the file server 4106 refers to the location management table 4108, the file server 4106 can specify the location of the mobile terminal 4101 which remotely operates the fixed computer 4103 and instructs the fixed computer 4103 to send the file access request, from the location of the mobile terminal corresponding to the IP address of the fixed computer.

A mobile terminal location 4201 of the location management table 4108 included in the file server 4106 indicates the location of the mobile terminal. The file server 4106 stores the location information of the mobile terminal 4101, which is periodically obtained by the fixed computer 4103 from the mobile terminal 4101 and periodically sent from the fixed computer 4103, in the location management table 4108. A fixed-computer IP address 4202 indicates the IP address of a fixed computer 4103 where the mobile terminal has logged in. The file server 4106 stores the IP address of the fixed computer 4103, which is periodically sent from the fixed computer 4103, together with the mobile terminal location 4201. For example, it is indicated that the location of the mobile terminal 4101, which remotely operates the fixed computer 4103 having an IP address of 192.168.0.10, is Japan.

FIG. 25 shows a configuration example of the keyword-based location ACL 4109 according to the third embodiment of this invention. The keyword-based location ACL 4109 includes a limiting keyword and information indicating the location where access is permitted.

The keyword-based location ACL 4109 is used to limit the location where access to a file that contains the limiting keyword is permitted.

A limiting keyword 4301 indicates a limitedly-used keyword such as a secret project name that is used only in the company, for example. An access-permitted location 4302 indicates a location where access to a file that contains the limiting keyword 4301 is permitted. The limiting keyword 4301 and the access-permitted location 4302 are specified by the administrator as needed, for example, at the time of the introduction of the system.

FIG. 26 shows a configuration example of the index table 4113 according to the third embodiment of this invention. The index table 4113 includes a file name 4401 and a keyword list 4402.

The index table 4113 is used to determine whether a file contains a limiting keyword.

The file name 4401 indicates the name of a file which is included in the file server 4106 and from which keywords are extracted through the index table generation processing performed by the search server 4111. The keyword list 4402 is a list of keywords contained in a file extracted by the search server 4111. Since the search server 4111 periodically performs the index table generation processing, even when a file is added or the content of a file is changed, the addition or change is reflected in the keyword list 4402.

Figure 27:
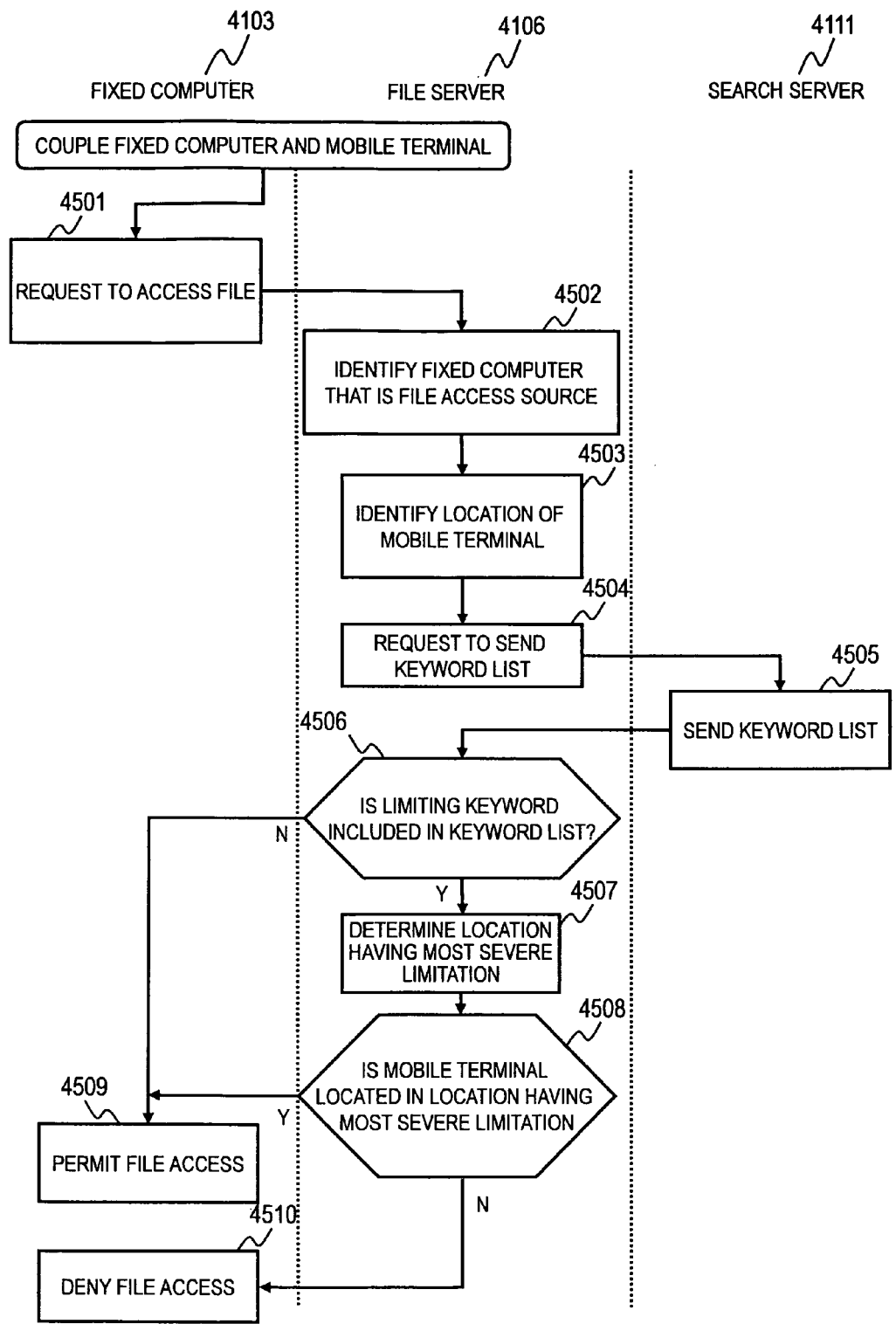
FIG. 27 is a flowchart showing an example of a flow of processing of a computer system in accordance with the third embodiment of this invention.

FIG. 27 is a flowchart showing an example of a flow of processing of the computer system according to the third embodiment of this invention.

After a connection between the fixed computer 4103 and the mobile terminal 4101 is established, in order to access a file included in the file server 4106, the mobile terminal 4101 remotely operates the fixed computer 4103 and causes the fixed computer 4103 to send a file access request (Step 4501). The file server 4106 receives the file access request and identifies the IP address of the fixed computer 4103 that has sent the file access request contained in the file access request (Step 4502). Then, the file server 4106 refers to the location management table 4108 to find the fixed-computer IP address 4202 that matches the identified IP address, and identifies the corresponding mobile terminal location 4201 (Step 4503). Next, in order to obtain the keyword list 4402 of the file requested to be accessed, the file server 4106 sends the file name to the search server 4111 to request the search server 4111 to send the keyword list 4402 (Step 4504). The search server 4111 refers to the index table 4113, obtains the keyword list 4402 corresponding to the received file name, and sends the keyword list 4402 to the file server 4106 (Step 4505).

The file server 4106 refers to the limiting keyword 4301 of the keyword-based location ACL 4109 to check whether the limiting keyword 4301 is included in the received keyword list 4402 (Step 4506). When the limiting keyword 4301 is not included, it indicates that there is no limitation and the file access is permitted in any area (Step 4509). When the limiting keyword 4301 is included, it indicates that there are limitations and a location having the most severe limitation is determined (Step 4507). The location having the most severe limitation indicates the location corresponding to a portion where at least two access-permitted locations 4302 are overlapped. This portion can be obtained by the logical product of all the overlapped access-permitted locations 4302. For example, when there is a file containing a keyword 1 and a keyword 3 of the limiting keyword 4301, because California is a part of the United States of America, the two corresponding locations are overlapped and California is determined to be the location having the most severe limitation. Even when there are at least two access-permitted locations 4302, if at least one of the access-permitted locations 4302 is not overlapped with the other, a location having the most severe limitation does not exist. When there is only one access-permitted location 4302, this access-permitted location 4302 is the location having the most severe limitation. Next, the file server 4106 determines whether the location of the mobile terminal 4101 is located at the location having the most severe limitation (Step 4508). When the mobile terminal 4101 is located at the location having the most severe limitation, the file access is permitted (Step 4509). When the mobile terminal 4101 is not located at the location having the most severe limitation, the file access is denied (Step 4510). When there is no location having the most severe limitation, that is, when there is at least one access-permitted location 4302 that does not overlapped with the other, the file access is denied (Step 4510).

According to the above-described embodiment, the location information of the mobile terminal 4101 is periodically sent to the file server 4106, and the file server 4106 performs file access control by using the keyword-based location ACL 4109, without changing the file access request. As a result, information leak can be prevented.

While the present invention has been described in detail and pictorially in the accompanying drawings, the present invention is not limited to such detail but covers various obvious modifications and equivalent arrangements, which fall within the purview of the appended claims.

What is claimed is:

1. A communication method for a communication system including a first computer, a second computer and a third computer, comprising:

a step of sending, from the first computer, a user identification of the first computer, a geometric location information of the first computer, and an identifier for identifying data, wherein the first computer is a portable computer that includes a location measurement device that obtains a geometric location of the first computer, the first computer remotely logging in the second computer from the geometric location of the first computer different from a geometric location of the third computer, and accessing the third computer via the second computer;

a step of receiving at the second computer the user identification of the first computer, the geometric location information of the first computer and the identifier for identifying the data by the second computer which is set at fixed location and remotely operated by the first computer, the second computer including a location management information indicating a user identification of the first computer and the geometric location information of the first computer;

a step of storing the received user identification of the first computer and the received geometric location information of the first computer in the location management information;

a step of sending, from the second computer to the third computer, a new access request which includes the received identifier, and the location management information;

a step of deciding, by the third computer, whether to send the data specified by the received identifier to the second computer, based on a correspondence relationship between the received identifier, the user identification and the geometric location information of the first computer sent from the second computer and an access control information indicating a correspondence relationship between an identifier for identifying the data, an access-permitted user identification and an access-permitted geometric location information indicating a user location which are held by the third computer;

a step of sending, from the third computer to the second computer, the data specified by the received identifier on a condition that the third computer decides to send the data; and a step of sending, from the second computer to the first computer, the received data.

2. The communication method according to claim 1, further comprising:
a step of receiving input of the identifier for identifying the data on a screen of the first computer;
a step of obtaining the geometric location information of the first computer and sending the obtained geometric location information to the second computer;
a step of generating screen data for displaying the data sent from the third computer; and
a step of displaying the generated screen data on the screen of the first computer.

3. The communication method according to claim 1, further comprising:
a step of deciding not to send the data to the second computer by the third computer;
a step of sending, from the third computer to the second computer, an error message indicating that the data cannot be sent; and
a step of sending, from the second computer to the first computer, the received error message.

4. The communication method according to claim 1, further comprising:
a step of sending, from the first computer to the second computer, the identifier for identifying the data;
a step of requesting, by the second computer, the first computer to send the geometric location information of the first computer; and
a step of obtaining, by the first computer, the geometric location information of the first computer in response to the request and sending the obtained geometric location information from the first computer to the second computer.

5. The communication method according to claim 1, further comprising:
a step of sending periodically, from the first computer to the second computer, the geometric location information of the first computer; and
a step of sending, from the first computer to the second computer, the identifier for identifying the data.

6. The communication method according to claim 1, further comprising: a step of deciding whether to send the data specified by the received identifier to the second computer, based on a correspondence relationship between the identifier for identifying the data held by the third computer and a keyword of this identifier, a correspondence relationship between the keyword of this identifier and geometric location information indicating a geometric location where access to the data specified by this identifier is permitted, and a correspondence relationship between the received identifier and the geometric location information.

7. A data transmission method for a file server coupled to a web server comprising:
a step of sending a webpage data from a second computer which is set at fixed location to a first computer which is a portable computer,
a step of sending webpage data to the second computer in response to an access request issued by the second computer;
a step of receiving, by the file server from the web server, an identifier for identifying file data specified by a URL of the webpage, an access-permitted user identification of the first computer and a geometric location information of the first computer;
a step of deciding, by the file server, whether to send the file data specified by the identifier to the web server, by referring to a correspondence relationship between an identifier, the user identification and the geometric location information of the first computer and an access control information indicating a correspondence relationship between an identifier for identifying the data, the access-permitted user identification and the geometric location information which are held by the second computer; and
a step of sending, from the file server to the web server, the file data specified by the identifier when the file server decides to send the file data; and
wherein the first computer remotely logs in the second computer from the geometric location of the first computer and accesses the file server via the second computer.

8. The data transmission method according to claim 7, further comprising:
a step of sending, from the file server to the web server, an error message indicating that the file data specified by the identifier cannot be sent to the second computer in case of which the file server decides not to send the file data.

9. A computer system comprising a second computer which is set at fixed location and a third computer, for sending data to a first computer which is a portable computer in response to a request for the data held by the third computer from a first computer, wherein:
the second computer is configured to:
receive a remote log in from the first computer from the geometric location of the first computer different from a geometric location of the third computer, the log in including user identification of the first computer, a geometric location information of the first computer and an identifier for identifying the data from the first computer;
store the received user identification of the first computer and the received geometric location information in a location management information;
send the received identifier for identifying the data and the location management information to the third computer when issuing an access request for the data to the third computer; and
send the data received from the third computer to the first computer thereby providing the first computer access to the third computer via the second computer; and
the third computer is configured to:
decide whether to send the data specified by the identifier to the second computer by referring to a correspondence relationship between the identifier, the user identification and the geometric location information of the first computer, which are sent from the second computer, and an access control information indicating a correspondence relationship between an identifier for identifying the data, an access permitted user identification and geometric location information which are held by the third computer; and
send the data specified by the identifier to the second computer in accordance with the decision.

10. The computer system according to claim 9, wherein:
the third computer includes a web server and a file server;
the data includes a webpage; and
the identifier includes a URL for identifying the webpage.

11. The computer system according to claim 10, wherein:
the second computer is further configured to
send, to the web server, the URL for specifying data of the webpage and the geometric location information of the first computer, which are received from the first computer, and send, to the first computer, the webpage data received from the web server;

the web server is configured to identify file data from the received URL, send, to the file server, an identifier for identifying the file data, obtain, from the file server, a correspondence relationship between the identifier and geometric location information held by the file server, decide whether to send the webpage data to the second computer, by referring to the geometric location information of the first computer and a correspondence relationship between the identifier and the geometric location information which are obtained from the file server, obtain the file data specified by the identifier from the file server in accordance with the decision, and generate the webpage data and send the generated webpage data to the second computer; and the file server is configured to obtain the correspondence relationship between the identifier and the geometric location information and send the identifier and the geometric location information to the web server when the identifier for identifying the file data is received from the web server, and send, to the web server, the file data specified by the identifier received from the web server.

12. The computer system according to claim 10, wherein:

the second computer is further configured to send, to the web server, the URL for specifying data of the webpage and the geometric location information of the first computer, which are received from the first computer, and send, to the first computer, the webpage data received from the web server;

the web server is configured to identify file data from the received URL, send, to the file server, an identifier for identifying the file data and the received geometric location information, receive the file data specified by the identifier from the file server, and generate the webpage data from the file data and send the generated webpage data to the second computer; and the file server is configured to decide whether to send the file data to the web server, by referring to a correspondence relationship between the received identifier and the received geometric location information, and a correspondence relationship between an identifier and geometric location information which are held by the file server, and send, to the web server, the file data specified by the identifier in accordance with the decision.

13. The communication method according to claim 1, further comprising:

a step of the second computer storing an access-permitted location information indicating a user location where access to the data related to the identifier is permitted; and a step of the second computer determining whether the first computer is in an access-permitted location.

14. The computer system according to claim 9, wherein the second computer is further configured to:

store an access-permitted location information indicating a user location where access to the data related to the identifier is permitted; and determine whether the first computer is in an access-permitted location.

\* \* \* \* \*